(12) United States Patent
Raveendran

(10) Patent No.: US 9,462,326 B2
(45) Date of Patent: *Oct. 4, 2016

(54) POWER AND COMPUTATIONAL LOAD MANAGEMENT TECHNIQUES IN VIDEO PROCESSING

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

This patent is subject to a terminal disclaimer.

(21) Appl. No.: 13/290,066

(22) Filed: Nov. 5, 2011

(65) Prior Publication Data

US 2012/0047359 A1    Feb. 23, 2012

Related U.S. Application Data

(63) Continuation of application No. 12/336,362, filed on Dec. 16, 2008, now Pat. No. 8,948,270.

(60) Provisional application No. 61/090,176, filed on Aug. 19, 2008, provisional application No. 61/114,988, filed on Nov. 14, 2008.

(51) Int. Cl.
*H04N 7/50* (2006.01)
*G06F 1/26* (2006.01)
(Continued)

(52) U.S. Cl.
CPC ........ *H04N 21/4348* (2013.01); *H04N 19/127* (2014.11); *H04N 19/174* (2014.11);
(Continued)

(58) Field of Classification Search
CPC .......... G06F 1/3203; G06F 1/26; H04N 7/50

USPC .............. 713/300, 320, 330; 375/240.26
See application file for complete search history.

(56) References Cited

U.S. PATENT DOCUMENTS 5,655,009 A    8/1997 Arai et al.
6,366,615 B2   4/2002 Kato et al.
(Continued)

FOREIGN PATENT DOCUMENTS

CN    1394443 A    1/2003
CN    1122908 C    10/2003
(Continued)

OTHER PUBLICATIONS

Erkip, E et al., "Total Power Optimization for Wireless Multimedia Communication," In System Level Power Optimization for Wireless Multimedia Communication, vol. Chapter1, p. No. 1-20, 2002.
(Continued)

*Primary Examiner* — Jessica M Prince
(74) *Attorney, Agent, or Firm* — Elaine H. Lo

(57) ABSTRACT

Techniques for power and computational load management in video processing and decoding are provided. In one configuration, an apparatus comprising a processor having a set of instructions operative to extract and compile information from a data stream having video is provided. The processor is operative to prioritize a set of parsing or decoding operations to process the data stream referred to as power management (PM) sequences based on the information and calculate projections of at least one of power and computational loading for each of the prioritized PM sequences.

44 Claims, 36 Drawing Sheets

(51) Int. Cl.
| | |
|---|---|
| *H04N 21/434* | (2011.01) |
| *H04N 21/438* | (2011.01) |
| *H04N 21/442* | (2011.01) |
| *H04N 21/443* | (2011.01) |
| *H04N 19/127* | (2014.01) |
| *H04N 19/174* | (2014.01) |
| *H04N 19/44* | (2014.01) |
| *H04N 19/42* | (2014.01) |

(52) U.S. Cl.
CPC ............ *H04N 19/42* (2014.11); *H04N 19/44* (2014.11); *H04N 21/4382* (2013.01); *H04N 21/443* (2013.01); *H04N 21/4424* (2013.01); *H04N 21/4432* (2013.01); *H04N 21/4436* (2013.01)

(56) References Cited

U.S. PATENT DOCUMENTS

| | | | |
|---|---|---|---|
| 6,408,099 | B2 | 6/2002 | Tan |
| 6,507,618 | B1 | 1/2003 | Wee et al. |
| 6,968,441 | B1 | 11/2005 | Schnee |
| 7,016,812 | B2 | 3/2006 | Aritsuka et al. |
| 7,111,177 | B1 | 9/2006 | Chauvel et al. |
| 7,142,204 | B2 | 11/2006 | Shiotsu et al. |
| 7,337,339 | B1 | 2/2008 | Choquette et al. |
| 7,376,437 | B2 | 5/2008 | Molkdar et al. |
| 7,450,963 | B2 | 11/2008 | Krishnan et al. |
| 7,721,011 | B1 | 5/2010 | Sutera |
| 7,795,752 | B2 | 9/2010 | Gorman et al. |
| 7,885,926 | B2 | 2/2011 | Grace et al. |
| 7,920,584 | B2 | 4/2011 | Matterne et al. |
| 7,941,677 | B2 | 5/2011 | Penning |
| 7,961,756 | B1 | 6/2011 | Lambert et al. |
| 8,041,967 | B2 | 10/2011 | Belady et al. |
| 8,122,267 | B2 | 2/2012 | Rui et al. |
| 8,125,936 | B2 | 2/2012 | Bar-Shalom |
| 8,126,461 | B2 | 2/2012 | Sengupta et al. |
| 8,159,520 | B1 * | 4/2012 | Dhanoa et al. ............ 348/14.02 |
| 8,225,112 | B2 | 7/2012 | Koul et al. |
| 2001/0004404 | A1 | 6/2001 | Itokawa |
| 2003/0007566 | A1 | 1/2003 | Peng et al. |
| 2003/0108100 | A1 | 6/2003 | Sekiguchi et al. |
| 2003/0217295 | A1 * | 11/2003 | Sadowski ..................... 713/300 |
| 2004/0041538 | A1 | 3/2004 | Sklovsky |
| 2004/0142733 | A1 | 7/2004 | Parise |
| 2004/0158878 | A1 * | 8/2004 | Ratnakar et al. ............ 725/150 |
| 2005/0101319 | A1 | 5/2005 | Murali et al. |
| 2005/0136961 | A1 | 6/2005 | Simonsson et al. |
| 2005/0237380 | A1 | 10/2005 | Kakii et al. |
| 2005/0276504 | A1 | 12/2005 | Chui et al. |
| 2006/0015508 | A1 | 1/2006 | Kondo et al. |
| 2006/0067406 | A1 | 3/2006 | Kitada et al. |
| 2006/0085794 | A1 | 4/2006 | Yokoyama |
| 2006/0095942 | A1 | 5/2006 | Van |
| 2006/0133495 | A1 | 6/2006 | Ye et al. |
| 2006/0291812 | A1 | 12/2006 | Takezaki |
| 2007/0010592 | A1 | 1/2007 | Bowman et al. |
| 2007/0021140 | A1 | 1/2007 | Keyes, IV et al. |
| 2007/0050647 | A1 * | 3/2007 | Conroy et al. ................ 713/300 |
| 2007/0116124 | A1 | 5/2007 | Wu et al. |
| 2007/0129045 | A1 | 6/2007 | Aerrabotu |
| 2007/0150592 | A1 * | 6/2007 | Bell ........................ G06F 1/28 709/226 |
| 2007/0173283 | A1 | 7/2007 | Livet et al. |
| 2007/0192641 | A1 | 8/2007 | Nagendra et al. |
| 2007/0220291 | A1 | 9/2007 | Stufflebeam |
| 2007/0220293 | A1 | 9/2007 | Takase |
| 2007/0226522 | A1 | 9/2007 | Aleksic et al. |
| 2007/0230563 | A1 | 10/2007 | Tian et al. |
| 2007/0283128 | A1 | 12/2007 | Hoshaku |
| 2007/0297511 | A1 | 12/2007 | Chiu et al. |
| 2008/0010473 | A1 | 1/2008 | Harris |
| 2008/0025409 | A1 * | 1/2008 | Tseng .................... H04N 19/44 375/240.25 |
| 2008/0031356 | A1 | 2/2008 | Uchida et al. |
| 2008/0074537 | A1 | 3/2008 | Kageyama et al. |
| 2008/0084491 | A1 * | 4/2008 | He ....................... H04N 19/176 348/333.13 |
| 2008/0111889 | A1 | 5/2008 | Fujita et al. |
| 2008/0252717 | A1 | 10/2008 | Moon et al. |
| 2008/0301474 | A1 | 12/2008 | Bussa et al. |
| 2008/0307240 | A1 | 12/2008 | Dahan et al. |
| 2009/0034941 | A1 | 2/2009 | Kageyama et al. |
| 2009/0059899 | A1 | 3/2009 | Bendelac |
| 2009/0091653 | A1 | 4/2009 | Kageyama et al. |
| 2009/0135918 | A1 | 5/2009 | Mak-Fan et al. |
| 2009/0210654 | A1 * | 8/2009 | Koul et al. ..................... 712/25 |
| 2009/0270138 | A1 | 10/2009 | Raveendran |
| 2009/0296815 | A1 | 12/2009 | Ngan et al. |
| 2009/0323809 | A1 | 12/2009 | Raveendran |
| 2010/0011012 | A1 * | 1/2010 | Rawson .................. H04L 67/30 707/E17.009 |
| 2010/0046631 | A1 | 2/2010 | Raveendran |
| 2010/0046637 | A1 | 2/2010 | Raveendran |
| 2011/0011012 | A1 | 1/2011 | Knight, III et al. |
| 2012/0054772 | A1 | 3/2012 | Raveendran |

FOREIGN PATENT DOCUMENTS

| | | |
|---|---|---|
| CN | 1522074 A | 8/2004 |
| CN | 1522541 A | 8/2004 |
| CN | 1523893 A | 8/2004 |
| CN | 1679218 A | 10/2005 |
| CN | 1695378 A | 11/2005 |
| EP | 0912063 A2 | 4/1999 |
| EP | 1096360 A1 | 5/2001 |
| EP | 1578136 A2 | 9/2005 |
| EP | 1924099 A1 | 5/2008 |
| JP | 5268275 A | 10/1993 |
| JP | 2001177827 A | 6/2001 |
| JP | 2001229040 A | 8/2001 |
| JP | 2003134156 A | 5/2003 |
| JP | 2004242308 A | 8/2004 |
| JP | 2005300943 A | 10/2005 |
| JP | 2005303738 A | 10/2005 |
| JP | 2005537546 A | 12/2005 |
| JP | 2006101322 A | 4/2006 |
| JP | 2006113767 A | 4/2006 |
| JP | 2007013315 A | 1/2007 |
| JP | 2007328461 A | 12/2007 |
| JP | 2008042566 A | 2/2008 |
| JP | 2008124646 A | 5/2008 |
| JP | 2008526119 A | 7/2008 |
| JP | 2009527133 A | 7/2009 |
| JP | 2010136383 A | 6/2010 |
| KR | 20010067341 A | 7/2001 |
| KR | 20030061798 A | 7/2003 |
| KR | 20040072030 A | 8/2004 |
| RU | 2189120 C2 | 9/2002 |
| RU | 2305377 C2 | 8/2007 |
| TW | I246645 B | 1/2006 |
| TW | 200805047 A | 1/2008 |
| TW | 200813701 A | 3/2008 |
| TW | 200814787 A | 3/2008 |
| WO | 9810593 A2 | 3/1998 |
| WO | 0219095 A2 | 3/2002 |
| WO | 03005729 A1 | 1/2003 |
| WO | 03050758 A2 | 6/2003 |
| WO | 2006001490 | 1/2006 |
| WO | 2006109985 A1 | 10/2006 |
| WO | 2007078663 A2 | 7/2007 |

OTHER PUBLICATIONS

International Search Report and the Written Opinion—PCT/US2009/054369 International Search Authority—European Patent Office—Nov. 20, 2009.
ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.

(56) References Cited

OTHER PUBLICATIONS

Jinzenji Kumi et al., "Automatic VOP Generation and its Application to MPEG-4 Coding", Picture Coding Symposium of Japan (PCSJ99), 14th Symposium Document, Japan, The Institute of Electronics, Information and Communication Engineers, Image Engineering Research Expert Committee, Sep. 1999, pp. 73 and 74.
Lu, et al., "Power Efficient Multimedia Communication Over Wireless Channels" IEEE Journal on Selected Areas in Communications, vol. 21, No. 10, pp. 1738-1751, Dec. 2003.
MPEG-4 Video Verification Model Version 7.0, ISO/IEC/JTC1/SC29/WG11, MPEG97/N1642, No. N1642, Apr. 1, 1997, pp. 19-23, 34-37, 40-54, 86-94, found in Internet at www.cs.sfu.ca/fas-info/cs/CC/880/li/raaterial/postscript/vm7.ps.Z.
"Special Topic 1, MPEG4 Newest Animation Format and its Technology", C Magazine, Japan, SOFTBANK Publishing Inc., Jan. 1, 2004, Issue of Jan. 2004 (vol. 16, No. 1), pp. 16-37.
Si W, et al., "A fast and adaptive interpolation method for video coding", Consumer Electronics, 2005. (ISCE 2005) Proceedings of the Ninth International Symposium on MACAU SAR Jun. 14-16, 2005, Piscataway, NJ, SA,IEEE, Jun. 14, 2005, pp. 80-82, XP010832121, ISBN: 978-0-7803-8920-5.
Sikora T, "The MPEG-4 Video Standard Verification Model" IEEE Transactions on Circuits and Systems for Video Technology, IEEE Service Center, Piscataway, NJ, US, vol. 7, No. 1, Feb. 1, 1997, XP011014363 ISSN: 1051-8215.
Yang, Y.T., et al, "Quality Enhancement of Frame Rate Up-Converted Video by Adaptive Frame Skip and Reliable Motion Extraction," IEEE Transactions on Circuits and Systems for Video Technology, IEEE Service Center, Piscataway, NJ, US, vol. 17, No. 12, Dec. 1, 2007, pp. 1700-1713, XP011195144 ISSN: 1051-8215.
Sakai Y., et al., "An Adaptive Video Flow Control Method for Multimedia Terminals," Journal of the Information Processing Society of Japan, Sep. 2000, vol. 41 (9), pp. 2455-2466, ISSN: 0387-5806.
Taiwan Search Report—TW098127904—TIPO—Dec. 18, 2013.

* cited by examiner

FIG. 9

TL DECODING MIPS AND POWER PROJECTOR — 154

230 →

| | C1 TRANSPORT LAYER INFORMATION | C2 DECODE PACKET SIZE | C3 BITRATE | C4 PROJECTED MIPS TO DECODE |
|---|---|---|---|---|
| R1 | $RAP_1$ | SIZE OF $RAP_1$ TRANSPORT PKT − (TRANSPORT HDR +PAD) | SIZE $(RAP_1-GOP_1)/$ $(PTS_2 - PTS_1)$ | 1. I-FRAME OF SIZE($RAP_1$) 2. BITSTREAM OF SIZE(RAP$_1$−GOP$_1$) FOR THE GIVEN CODEC |
| R2 | $RAP_2$ | SAME AS ABOVE BUT FOR $RAP_2$ | SAME AS ABOVE BUT FOR $RAP_2$ | SAME AS ABOVE BUT FOR $RAP_2$ |
| ⋮ | ⋮ | ⋮ | ⋮ | ⋮ |
| RN | $RAP_N$ | SAME AS ABOVE BUT FOR $RAP_N$ | SAME AS ABOVE BUT FOR $RAP_N$ | SAME AS ABOVE BUT FOR $RAP_N$ |
| RN+1 | TIME SLICE | SIZE OF TIME SLICE − (TRANSPORT HDR +PAD) | SIZE OF TIME SLICE/ $(PTS_2 - PTS_1)$ | BITSTREAM SIZE(TIME SLICE) FOR THE GIVEN CODEC |

POWER AND COMPUTATIONAL LOAD MANAGEMENT TECHNIQUES IN VIDEO PROCESSING

RELATED APPLICATIONS

This application is a continuation of U.S. application Ser. No. 12/336,362 filed Dec. 16, 2008, is related to U.S. patent application filed on the same date as the present application, entitled POWER AND COMPUTATIONAL LOAD MANAGEMENT TECHNIQUES IN VIDEO PROCESSING and claims the benefit of U.S. Provisional Application Nos. 61/090,176 filed Aug. 19, 2008, and 61/114,988 filed Nov. 14, 2008, which are all assigned to the assigner hereof and hereby expressly incorporated by reference in each of their entirety for all purposes.

TECHNICAL FIELD

The present disclosure relates generally to the field of video processing and, more specifically, to techniques for power and computational load management in video processing and decoding.

BACKGROUND

The amounts of digital information included in video data are massive and tend to increase along with advances in performance of video cameras. Processing of the video data places large demands on power and computational resources of video-enabled devices and, in particular, wireless communication devices such as cellular phones, personal digital assistants (PDAs), laptop computers, and the like.

Although video compression primarily reduces spatial and temporal redundancy, there are several pre-processing and post-processing operations that are required after the source video has been captured (or extracted from storage as the case may be) and before the reconstructed video is rendered (consumed) at the display. Video Processing places large demands on memory (stored and data transfer) and computational load primarily due to the required arithmetic operations which are directly proportional to power requirements (battery, talk time, etc).

Given the amount of redundancy in video, a proportional reduction in the quantity of such operations should be expected. Since compression ratios are many orders of magnitude (100:1 to 1000:1), a significant reduction in the amount of video data to be processed can be achieved in spite of implementation overheads. Spatio-temporal redundancy can be identified using compression metadata and correspond to redundant operations reducing which, saves power. Different levels of redundancy translate to different levels of consumed power and computational loading.

There is therefore a need for techniques for power and computational load management in video processing and decoding.

SUMMARY

Techniques for power and computational load management in video processing and decoding are described herein. In one configuration, an apparatus comprising a processor having a set of instructions operative to extract and compile information from a bitstream having video is provided. The processor is operative to prioritize power management (PM) sequences of decodable units from the bitstream for selectively decoding the decodable units based on the information and calculated projections of at least one of power and computational loading for each of the prioritized PM sequences of decodable units. The apparatus also includes a memory coupled to the processor.

In another aspect, an integrated circuit (IC) comprising a processor having a set of instructions operative to extract and compile information from a bitstream having video is provided. The processor is operative to prioritize PM sequences of decodable units from the bitstream for decoding operations based on the information and calculate projections of at least one of power and computational loading for each of the prioritized PM sequences of decodable units. The integrated circuit also includes a memory coupled to the processor.

In another configuration, a computer program product including a computer readable medium having instructions for causing a computer to extract and compile information from a bitstream having video is provided. The instructions further cause the computer to prioritize PM sequences of decodable units from the bitstream for selectively decoding the decodable units based on the information and calculate projections of at least one of power and computational loading for each of the prioritized PM sequences of decodable units.

A further aspect of the configurations includes a decoder engine which selectively decodes one or more of the prioritized PM sequences of decodable units based on a selected low power mode for the available power and/or current computational loading.

The summary is neither intended nor should it be construed as being representative of the full extent and scope of the present disclosure, which these and additional aspects will become more readily apparent from the detailed description, particularly when taken together with the appended drawings.

BRIEF DESCRIPTION OF THE DRAWINGS

FIG. 9 shows a TL decoding MIPS and power projector.

Figure 1:
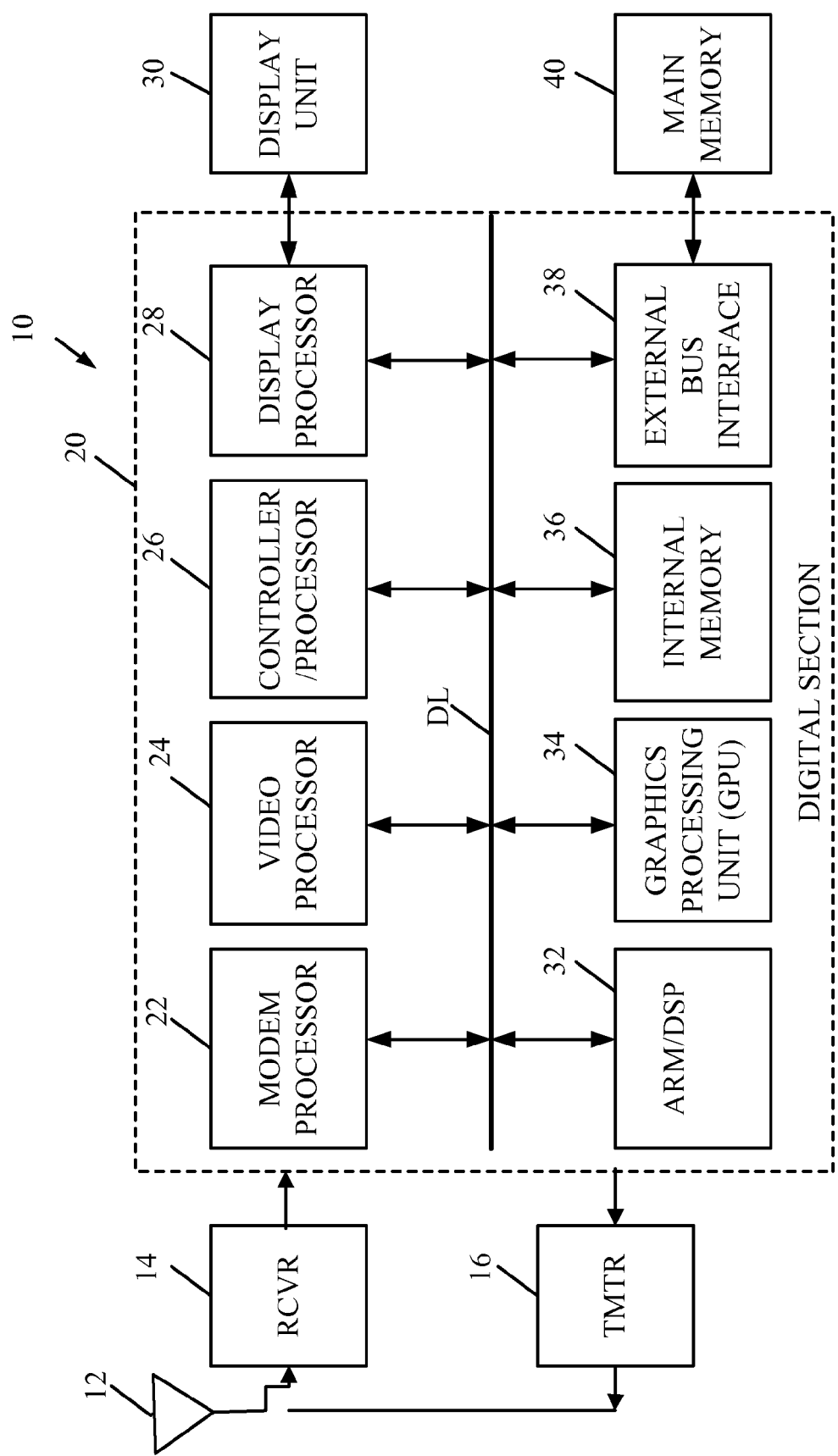
FIG. 1 shows a general block diagram of a wireless device.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features configurations may be beneficially incorporated in other configurations without further recitation.

The appended drawings illustrate exemplary configurations of the disclosure and, as such, should not be considered as limiting the scope of the disclosure that may admit to other equally effective configurations.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

The techniques described herein may be used for wireless communications, computing, personal electronics, handsets, etc. An exemplary use of the techniques for wireless communication is described below.

FIG. 1 shows a block diagram of a configuration of a wireless device 10 in a wireless communication system. The wireless device 10 may be a handset. The wireless device 10 or handset may be a cellular or camera phone, a terminal, a wirelessly-equipped personal digital assistant (PDA), a wireless communications device, a video game console, a laptop computer, a video-enabled device or some other wirelessly-equipped device. The wireless communication system may be a Code Division Multiple Access (CDMA) system, a Global System for Mobile Communications (GSM) system, or some other system.

The wireless device 10 is capable of providing bi-directional communications via a receive path and a transmit path. On the receive path, signals transmitted by base stations are received by an antenna 12 and provided to a receiver (RCVR) 14. The receiver 14 conditions and digitizes the received signal and provides samples to a digital section 20 for further processing. On the transmit path, a transmitter (TMTR) 16 receives data to be transmitted from the digital section 20, processes and conditions the data, and generates a modulated signal, which is transmitted via the antenna 12 to the base stations.

The digital section 20 includes various processing, interface and memory units such as, for example, a modem processor 22, a video processor 24, a controller/processor 26, a display processor 28, an ARM/DSP 32, a graphics processing unit (GPU) 34, an internal memory 36, and an external bus interface (EBI) 38. The modem processor 22 performs processing for data transmission and reception (e.g., modulation and demodulation). The video processor 24 performs processing on video content (e.g., still images, moving videos, and moving texts) for video applications such as camcorder, video playback, and video conferencing. The video processor 24 performs video encoding and decoding or codec operations. The video encoding and decoding operations may be performed by another processor or shared over various processors in the digital section 20. The controller/processor 26 may direct the operation of various processing and interface units within digital section 20. The display processor 28 performs processing to facilitate the display of videos, graphics, and texts on a display unit 30. The ARM/DSP 32 may perform various types of processing for the wireless device 10. The graphics processing unit 34 performs graphics processing.

The GPU 34 may be compliant, for example, with a document "OpenGL Specification, Version 1.0," Jul. 28, 2005, which is publicly available. This document is a standard for 2D vector graphics suitable for handheld and mobile devices, such as cellular phones and other referred to above wireless communication apparatuses. Additionally, the GPU 34 may also be compliant with OpenGL2.0, OpenGL ES2.0, or D3D9.0 graphics standards.

The techniques described herein may be used for any of the processors in the digital section 20, e.g., the video processor 24. The internal memory 36 stores data and/or instructions for various units within the digital section 20. The EBI 38 facilitates the transfer of data between the digital section 20 (e.g., internal memory 36) and a main memory 40 along a bus or data line DL.

The digital section 20 may be implemented with one or more DSPs, micro-processors, RISCs, etc. The digital section 20 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Raw video data may be compressed in order to reduce the amount of information that must be transmitted to or processed by wireless device 10 or other video-enabled device. Compression may be performed using, for example, video coding techniques compliant with one or more of industry-adapted video compression and communication standards, including those standards by ISO/IEC's Moving Picture Expert Group MPEG-2 and MPEG-4, ITU-T's H.264/AVC, or others (AVC stands for Advanced Video Coding). Video coding techniques compliant with non-standard compression methods such as VP6 used in Adobe Flash player may also be used to generate the compressed video data. In the configurations, the raw and compressed video data may be transmitted to, from, or within the wireless device 10 or other video-enabled device using wireless or wired interfaces or a combination thereof. Alternatively, the compressed data may be stored in media such as DVDs.

The compressed video data is encapsulated in a payload format for transmission using transport protocols using, for example, Internet Protocol (IP) as defined by IETF in Real Time Transport Protocol specifications.

Figure 2A:
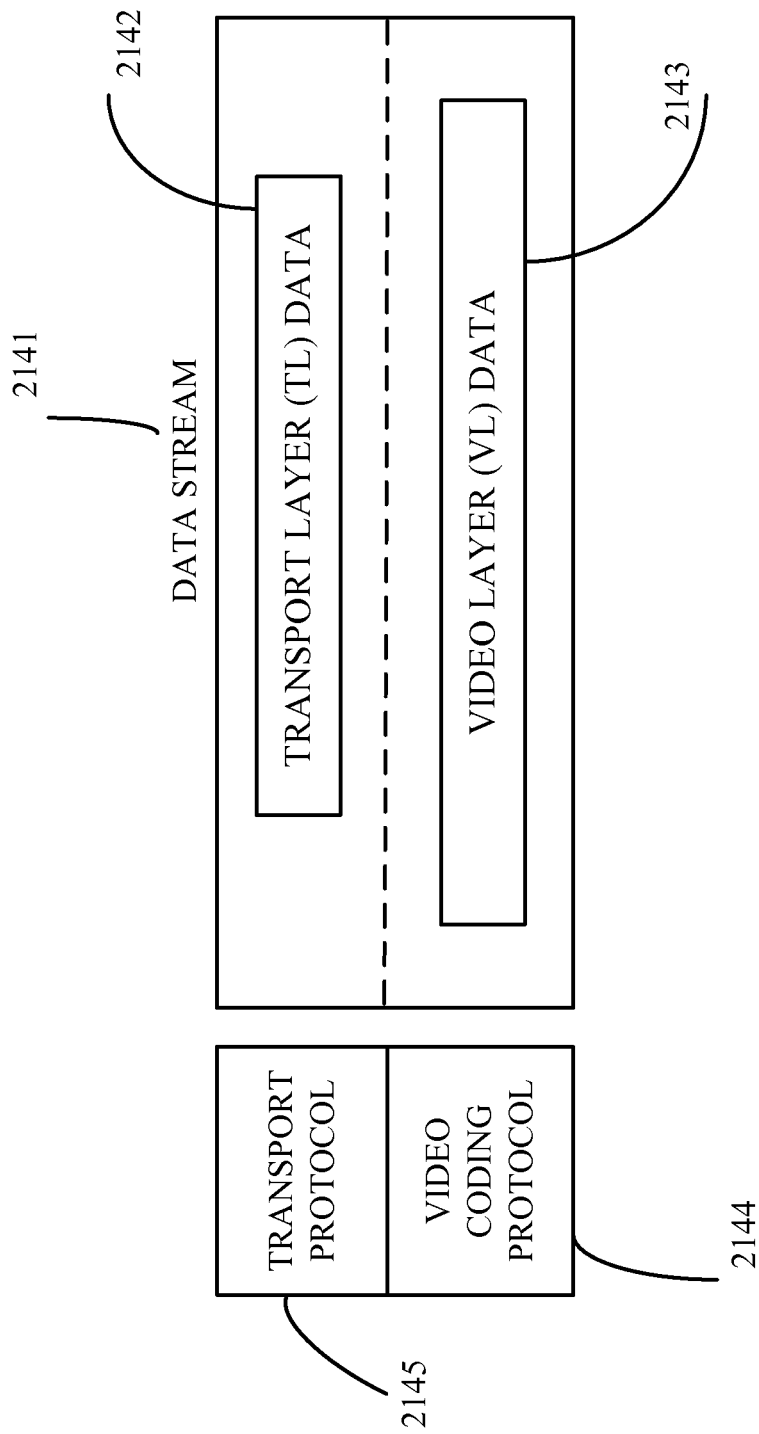
FIG. 2A shows a data stream

FIG. 2A shows a block diagram of a data stream and the corresponding protocols that must be transmitted or processed by wireless device 10 or other video-enabled device. A data stream, 2141, comprised of transport layer data 2142, for example, encapsulation as specified by the transport protocol specification, 2145, and video layer data, 2143. The transport layer data follows format or syntax or semantics of data representation as specified in the corresponding transport protocol and video layer data follows format or syntax or semantics for representation of video data as specified in video coding protocol, 2144, such as the compression standards.

A Transport Protocol 2145 encapsulates video layer data for transmission or storage, e.g. file format like MP4 or transport format such as RTP or UDP or IP. A Video Coding protocol 2144 can be a video coding standard such as MPEG-2 or MPEG-4 or H.264/AVC or any other video codec such as Real Video or Windows Media etc. The syntax and semantics of the transport layer data is governed or specified by the transport protocol and syntax and semantics of the video layer data is governed or specified by the video coding protocol.

Figure 2B:
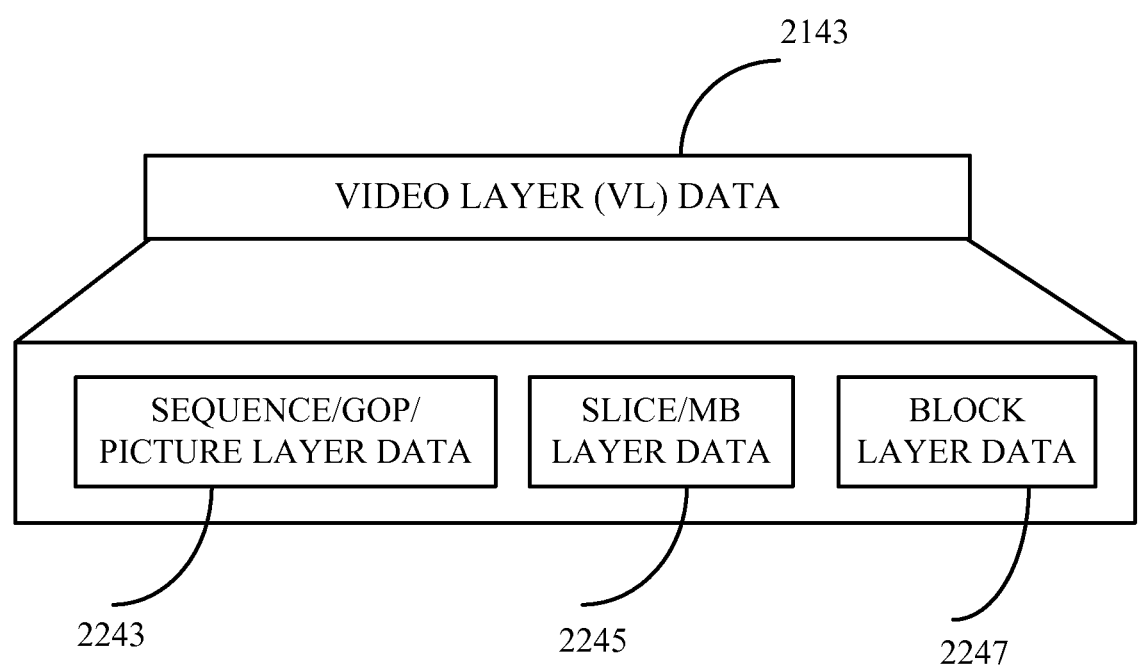
FIG. 2B shows a video layer data.

FIG. 2B shows the format of the video layer data, 2143. The video layer data comprises a sequence or group of pictures (GOP) or a picture layer data, 2243, a slice or macroblock (MB) layer data, 2254 and a block layer data, 2247.

At the receiver, when the data stream is received, in traditional systems, the video processor parsers and decodes the data stream in the order specified by the corresponding transport protocol specification and the video coding protocol or standard specification. The transport parser unwraps the encapsulation in an order corresponding to the transport protocol specification herein referred to as normal parsing operation. The video decoder parsers and decodes the video layer data in an order specified by the video coding protocol or standard specification herein referred to as normal decoding operation.

In the described system and methods below, the video processor selectively parses and/or decodes or processes parts of the data stream and the order of the parsing and/or decoding and processing operations is based on available power or computational processing power.

Figure 2C:
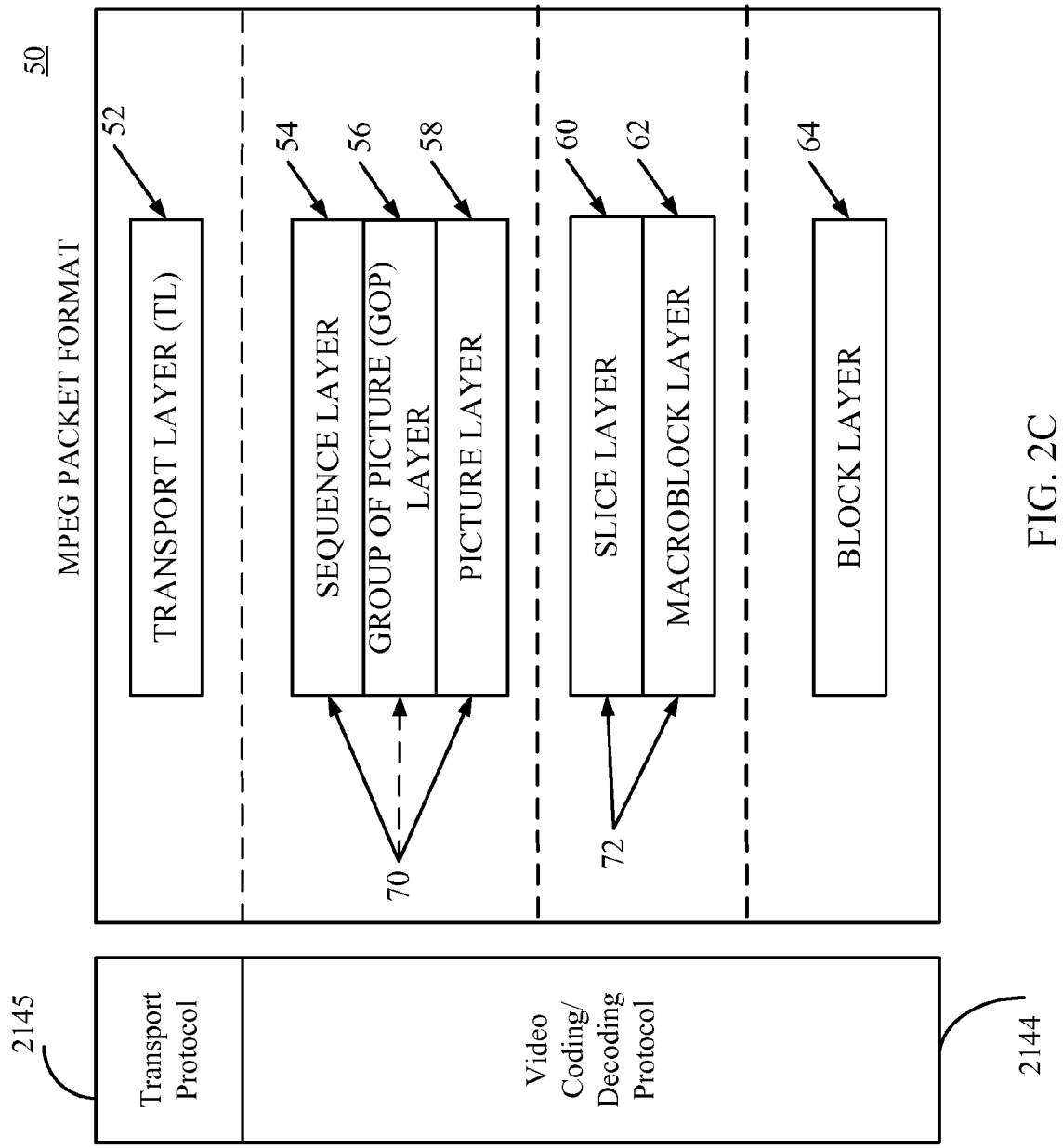
FIG. 2C shows a general MPEG format.

FIG. 2C shows a general MPEG packet format 50. An MPEG packet format is an example of a data stream, 2141. The MPEG packet format 50 includes a plurality of MPEG layers 52, 54, 56, 58, 60, 62 and 64. The MPEG layers include a transport layer 52, a sequence layer 54, a group of pictures (GOP) layer 56, a picture layer 58, a slice layer 60, a macroblock (MB) layer 62 and a block layer 64. In FIG. 2A, the layers are shown stacked to represent a hierarchical order of layers that require decoding and processing. For the purposes of description herein, the sequence and picture layers 54 and 58 are grouped together and called a video sequence/picture layer (VS/PL) 70 for the purposes of power load management described herein. In some standards, only a sequence layer may be present or a picture layer or a combination of layers. Additionally, the slice and macroblock (MB) layers 60 and 62 are grouped together to form a slice/MB layer (S/MBL) 72 for the purposes of power load management described herein. In some standards, one or more of the layers may be omitted or combined.

In MPEG compression, video frames may be coded and formatted into a group of pictures (GOP) which may include one or more of an intra-coded (I) frame, a predictive-coded (P) frame, and a bidirectionally predictive-coded (B) frame. Some B-frames may be reference frames. Non-reference B-frames may be designated as b-frames. As can be appreciated, describing all the frames and arrangement of frames in the standards is prohibitive.

Figure 2D:
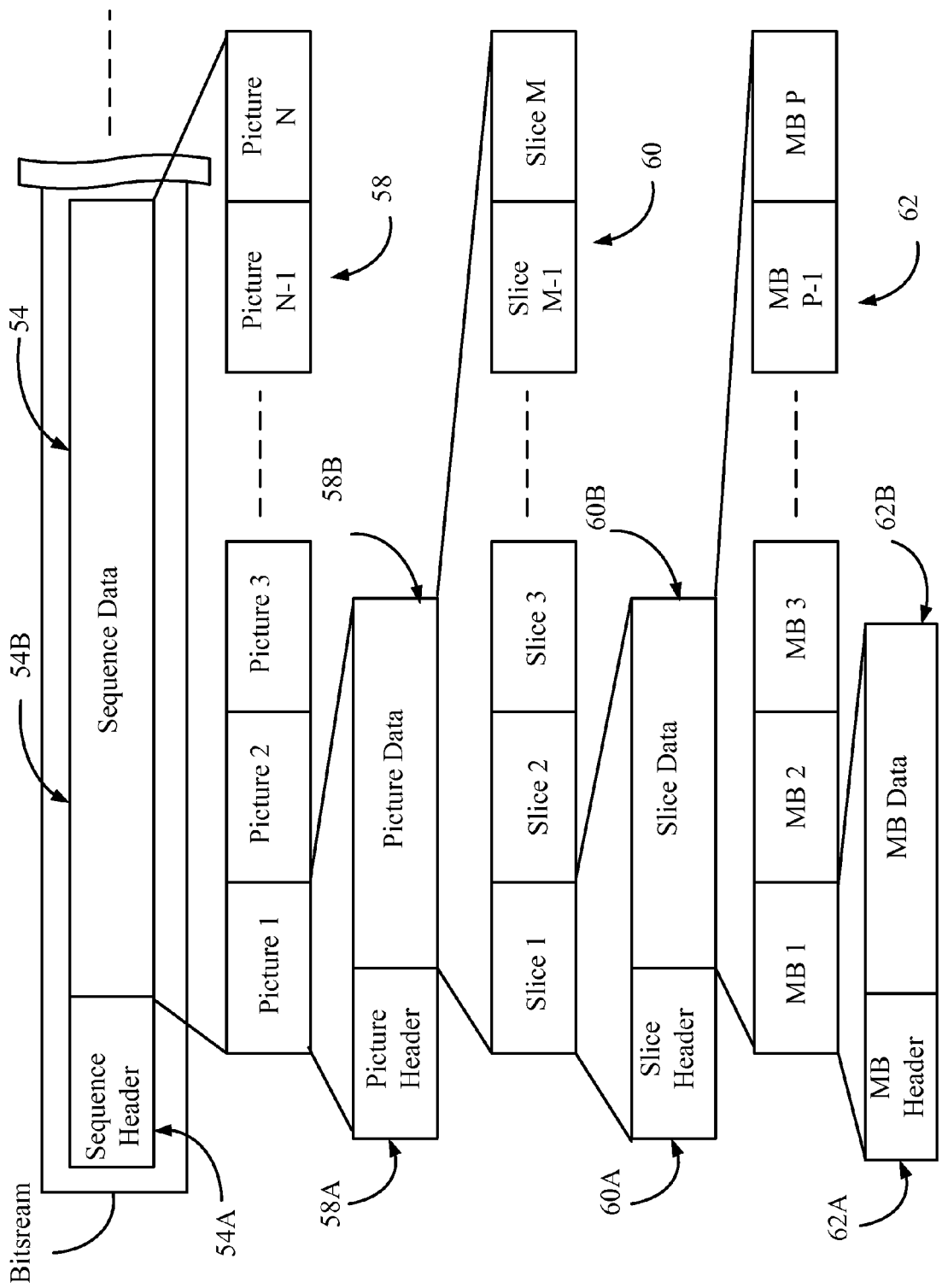
FIG. 2D shows a general MPEG bitstream with decodable units.

FIG. 2D shows a general MPEG bitstream with decodable units. The bitstream includes, at the sequence layer 54, a sequence header 54A followed by sequence data 54B. The sequence layer 54 is a decodable unit. The sequence data 54B includes the picture layer 58 which includes a plurality of pictures denoted as picture 1, picture 2, picture 3, . . . , picture (N−1) and picture N. Each picture is a decodable unit. Each picture includes a picture header 58A and picture data 58B. The picture data 58B includes the slice layer 60. The slice layer 60 includes a plurality of slices denoted as slice 1, slice 2, slice 3, . . . , slice (M−1) and slice M. Each slice is a decodable unit. The slice includes a slice header 60A followed by slice data 60B. The slice data 60B of a slice includes the macroblock layer 62. The macroblock layer 62 includes a plurality of macroblocks denoted as MB 1, MB 2, MB 3, . . . , MB (P−1) and MB P. Each macroblock is a decodable unit. Each macroblock includes a MB header 62A and MB data 62B. Some decodable units are dependent on another decodable unit. Thus, prioritization will take into consideration dependent decodable units. Moreover, one or more of the decodable units in each layer are divisible.

Figure 3A:
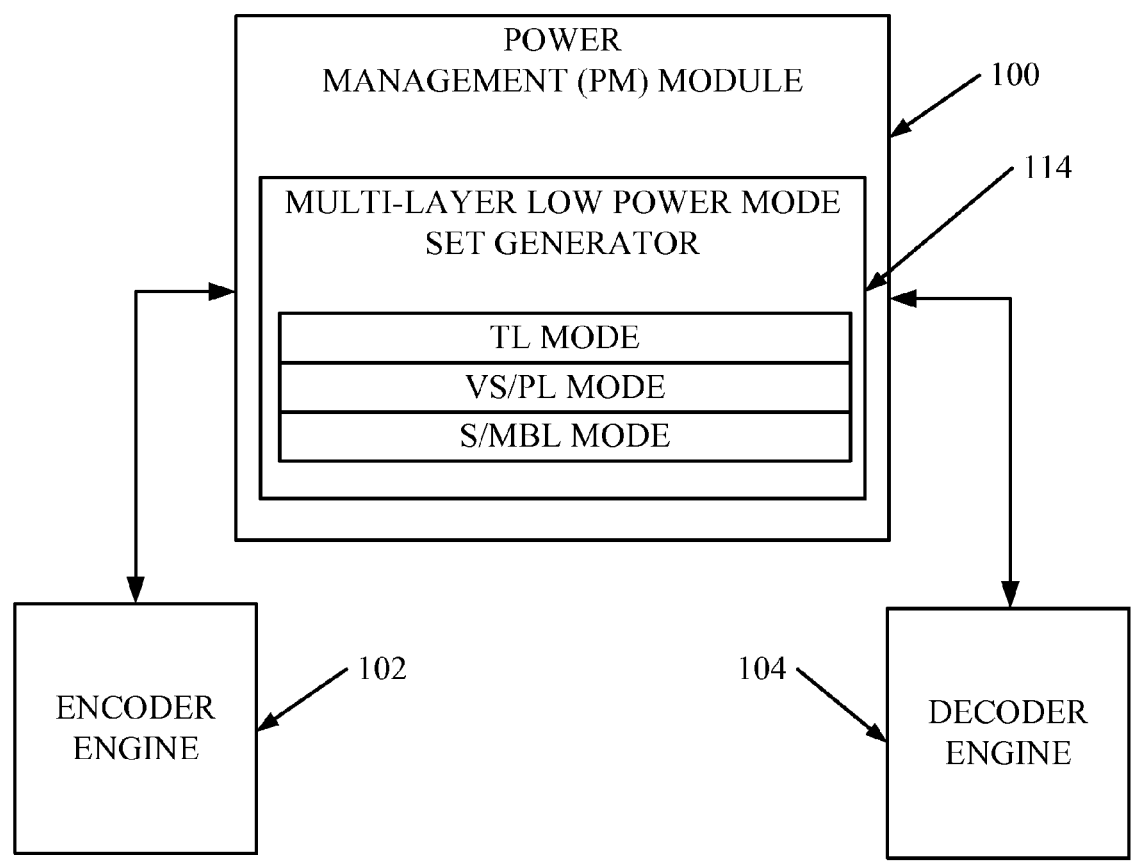
FIG. 3A shows a block diagram of a power management module and video encoder and decoder engines.

FIG. 3A shows a block diagram of a power management module 100 and video encoder and decoder engines 102 and 104. The power management module 100 has a multi-level low power mode set generator 114. The multi-level mode set generator 114 has a plurality of low power modes arranged in accordance with the hierarchical (tiered) layers of the MPEG format. The plurality of low power modes are based on prioritized power management (PM) sequences of decodable units that may be selectively decoded for improved granularity and/or visual quality at each layer. Granularity may refer to the extent of parsing or decoding operations that can be executed to maximize the resulting visual quality for a given power consumption target. PM sequences are sequences of decoding or parsing operations that facilitate power management. PM sequences attempt to maximize visual quality for a given power through look-ahead processing of selective decode and/or parsing operations. The multi-level low power mode set generator 114 has a plurality of layer modes. In this configuration, the plurality of layer modes includes a TL mode, a VS/PL mode and a SL/MB mode. As can be appreciated, the techniques described herein are not limited to the MPEG format but may be used with other video compression and/or transport protocol formats.

In one embodiment, information from a data streaming including video data is extracted and compiled and based on this information, the sequences of decoding and parsing operations for the data stream that facilitates power management (PM sequences) is prioritized.

In another embodiment, the prioritization is based on look-ahead processing of at least one of decoding and parsing operations. In yet another embodiment, projections of at least one of power and computational loading for each of the prioritized PM sequences is calculated. In another embodiment, the prioritizing of power management sequences is based on at least one of visual quality and granularity.

The embodiments further comprise generating a hierarchical list of low power modes to selectively decode the prioritized power management sequences, based on the prioritization. The selection of a low power mode may be in response to available power or computational loading. In addition, the selective decoding one or more of the prioritized power management sequences may be in response to the selected low power mode. In another embodiment, the selective decoding may be based on calculating projections of at least one of power and computational loading for the prioritized power management sequences.

In the exemplary configuration, degrees of redundancy indicated by prediction modes, for example, yields a graduated set of layers which in turn can be mapped to a graduated set of low/reduced power operational modes. One format using H.264 prediction modes is based on the fact that the level of redundancy in video in decreasing order corresponding to inter and intra prediction modes includes: Skip, Direct, Inter, and Intra prediction modes. The order of modes also corresponds to the order of increasing impact on visual quality when compromised (when inaccuracies are introduced in decoding and reconstruction of MBs corresponding to these modes). These concepts can be extended to other video coding standards and formats.

To exploit the redundancy in video toward power optimized video processing, several aspects involving the decoder engine 104 only, encoder engine 102 only or coordinated across the encoder and decoder engines may be employed for power load management. In the case of a decoder engine only (DO) solution, the DO solution may be applied during decoding or rendering at the device 10 and are encoder agnostic. The solutions may be are divided into conformant and non-conformant categories. A conformant category solution would output a video stream which maintains standards conformance. Here, strict conformance requirements are to be met. In a non-conformant solution, an advantage of this solution is flexibility and larger reduction (compared to conformant) in complexity for minimal impact to visual quality.

In the case of an encoder engine 102 only (EO) solution, all complexity reduction methods are incorporated during encoding and are decoder agnostic. In the EO solution all encoding functions are biased from the perspective of processing power. Optionally, a cost function for processing power is included in rate-distortion (RD) optimizations referred to as RD-power optimizations.

In the case of a joint encoder-decoder engine (JED) solution, power reduction methods are incorporated or adopted during the encoding and the decoder engine performs appropriate reciprocal actions to provide increased reduction (in power/load/cost). In the JED solution, the encoder engine is aware of the capabilities of the decoder engine to apply DO solution methods described above and incorporates indicators for appropriate actions in the bitstream (user field or supplemental enhancement information (SEI) messages) or side channel for use at the decoder engine. A previously agreed upon protocol based on a set of power reduction would may be adopted by both encoder and decoder engines for increased reduction in power/load/cost.

DO solutions apply to open ended applications where the decoder engine is unaware of the encoding process. Examples would include Mobile TV, Video-On-Demand (VOD), PMP, etc. The EO solutions would find application in video servers where power friendly bitstreams are required to drive low power devices. The EO solution is also useful in scenarios where multiple coded versions of a source are generated and a network server adaptively selects/switches between them based on network/channel conditions. JED solutions provide the most gain in terms of power reduction for a given quality compared to DO or EO solution methods. The JED solution apply to closed or conversational applications where a communications/control path (real-time or apriori) is possible.

The description below is directed to DO solutions and provides a multi-layer framework configuration to regulate implementation and operational complexity in video decoding. Load management in video decoding and rendering operations are possible where an extended video playback is required by various applications such as Mobile TV, portable multimedia player (PMP), (movie/DVD players), etc. The techniques described herein embodied in the multi-layer framework configuration may be extended to any video or multimedia application.

Load or power management refers to regulation of runtime complexity including but not limited to delays, power consumption and million instruction per second or processor cycles (MIPS) availability. Regulation includes optimizing the user experience, in particular, video quality given the available processing, power and time resources. The multi-layer framework configuration allows such regulation at various levels of granularity for both precautionary and reactionary responses to instantaneous demands on the video decoder implementation by the application(s). Alternate execution or control/data flow paths are recommended based on available information and power (battery) levels and to avoid processor stalling.

In view of the foregoing, the description provided herein is primarily directed to DO operations as performed by the decoder engine 104. The video decoding by the decoder engine 104 may be followed by rendering, performed by a rendering stage 28A (FIG. 23) in the display processor 28. Decoding/rendering does not have to be a serial process. For example, multiple slices could be decoded in parallel, rows of an image may be rendered in parallel or in a waveform fashion which may not be considered serial. Nonetheless, although decoding followed by rendering in serial order is the norm, in one configuration these operations are parallelized. Rendering typically includes post-processing (color-space conversion, scaling, etc.) followed by compositing the image to be display and the display process (transferring to a display buffer, reading from this buffer and writing to display). For the sake of example, decoding is followed by rendering in a serial process and occurs in chronological order (timing is based on decode time stamps for decoding and presentation time stamps for rendering/displaying). However the input to this process (decoding and rendering) is a video bitstream (except maybe in the case of the viewfinder) which is not necessarily prioritized by order of importance in terms of visual quality (i.e. Instantaneous Decoder Refresh (IDR), intraframe (I) and predicted (P) frames are interspersed). Also, the transport layer protocol that delivers the video bitstream to the decoder engine 104 does so in packets which are presented to the decoder engine 104 in order of packet/sequence numbers. Processing the bitstream in the received order may result in frame drops and does not allow for throttling the quality of the output video for low power operations (either user-initiated to conserve battery or modulated by the system based on available or allocated power). Lack of processor cycles, MIPS and/or accumulated delays and latencies may result in key frames, typically larger in size, being dropped causing video to stall for long durations.

The encoder engine 102 acquires or generates and compresses video data in compliance with MPEG standards, H.264 or other standards. The video data is processed to extract a selected portion of video information so that encoding meets image quality, power, and/or computational load requirements of the device 10 and/or transmission capabilities of an output video interface, bandwidth or other characteristics of the device 10 or video-enabled device (for example, wireless or wired interface). Additionally, encoding may be such that decoding (by a recipient) meets quality, power and/or computational requirements and capabilities of the recipient's decoder engine or receiver 14.

Figure 3B:
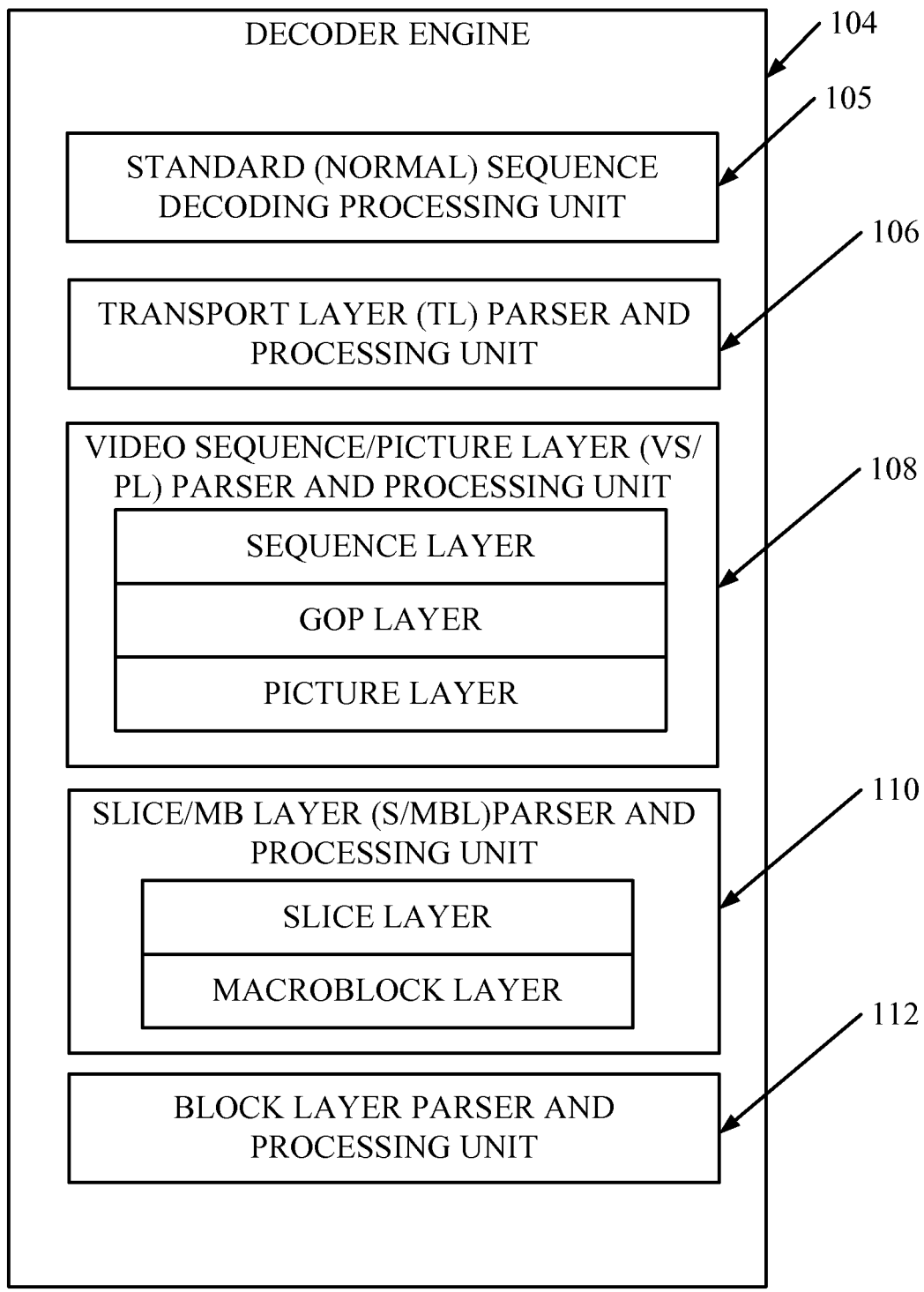
FIG. 3B shows a block diagram of the decoder engine for use with the power management module.

FIG. 3B shows a block diagram of the decoder engine 104 for use with the power management module 100. The decoder engine 104 includes a standard (normal) sequence decoding processing unit 105 to decode the bitstream when power management or a low power mode is not necessary. The decoder engine 104 also includes a transport layer (TL) parser and processing unit 106, a video sequence/picture layer (VS/PL) parser and processing unit 108, a slice/MB layer (S/MBL) parser and processing unit 110, a block layer parser and processing unit 112. In the exemplary configuration, power and computation load management at the block layer 64 is not described.

As will be seen from the description below, the TL parser and processing unit 106 parses and processes the transport layer 52. The VS/PL parser and processing unit 108 parses and processes at least the sequence layer 54 and the picture layer 58. The combination of the sequence layer 54 and the picture layer 58 is herein after referred to as a video sequence/picture layer (VS/PL) 70. However, the VS/PL parser and processing unit 108 may also parse and process the GOP layer 56 or some other parser and processing unit may be employed for the GOP layer 56. Thus, the line from the reference numeral 70 to the GOP layer 56 is shown in phantom. The S/MBL parser and processing unit 110 parses and processes the slice layer 60 and the macroblock (MB) layer 62. The block layer parser and processing unit 112 parses and processes the block layer 64 in order to decode the video or programming in the MPEG format.

One or more of the parser and processing units 106, 108, 110, and 112 may be employed to operate in parallel, separately or in a combined relationship to carryout the power and computational load management functions described herein. Furthermore, one or more of the power and computational load management functions of the parser and processing units 106, 108, 110, and 112 may be omitted. Nonetheless, in the exemplary configuration, the parser and processing units 106, 108 and 110 are selectively actuated as necessary to provide a tiered power and computational load management function which controls the visual quality, trading visual quality for power loading and granularity in any one of the tiers so as to also maintain or enhance the user's experience while using power efficiently.

Figure 4:
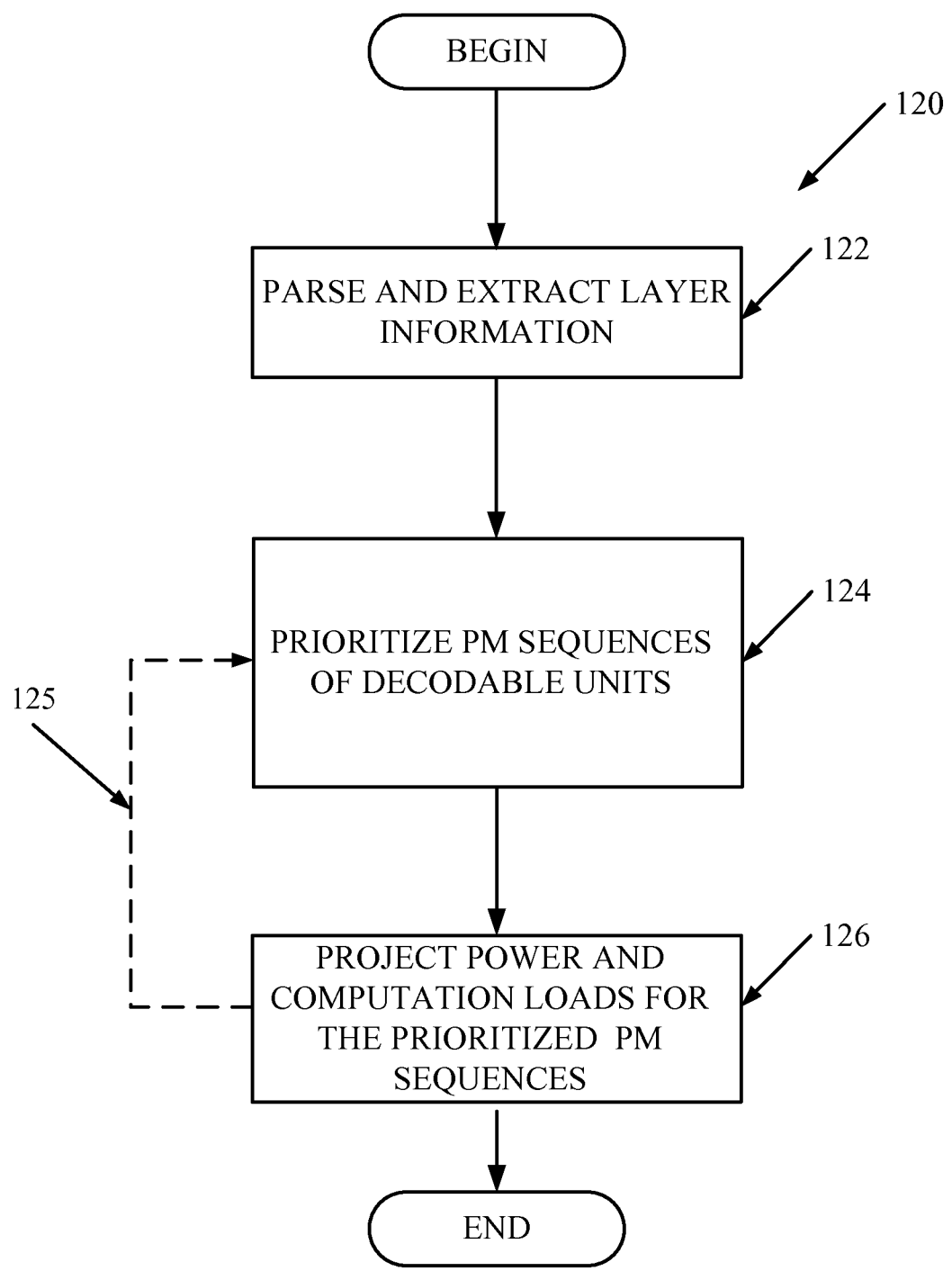
FIG. 4 shows a flowchart of a process for projecting power and computational loads for decoding prioritized power management (PM) sequences of decodable units.

FIG. 4 shows a flowchart of a process 120 for projecting power and computational loads for decoding prioritized power management (PM) sequences of decodable units. In order to prioritize the bitstream and the consequent power management (PM) sequences of decodable units for selective decoding, a three-phase (3-phase) process 120 is provided for each hierarchical (tiered) layer to provide hierarchically arranged low power operational modes. The process 120 relies on non-causality in the video bitstream and its efficiency depends on the amount of look-ahead (decoder engine's input buffer depth).

The process 120 begins at block 122 where parsing and extracting layer information takes place. Block 122 is followed by block 124 where those PM sequences (not to be confused with the sequence layer) of decodable units requiring decoding are prioritized. For illustrative purposes, the prioritized PM sequences of decodable units are shown in the form of a list, as will be described in more detail later. The term "prioritized PM sequences of decodable units," will hereinafter sometimes be referred to as "prioritized PM sequences." However, each sequence includes one or more divisible decodable units. A decodable unit comprises one or more or groups of a picture, a slice, and macroblocks, as will be seen from the following description.

Block 124 is followed by block 126 where the power and computation load for the prioritized PM sequences are projected. In the exemplary configurations, the computational load is projected as a function of the number of million instructions per second (MIPS). A corresponding MIPS requires a projected or predetermined power.

At block 126, there is a correlation of the prioritized PM sequences to corresponding MIPS and, subsequently, the power required to decode one or more of the PM sequences. Blocks 122 and 124 are described below with respect also the H.264 standard. Block 126 may use the results from power analysis corresponding to typical scenarios (e.g. test bitstreams) and, optionally, feedback driven training or run-time updates for use in the projection. Once a bitstream is known, the power and computation loads (processing power) may be projected to inform the user whether there is not enough power in the device 10 to decode the bitstream to completion. Thus, if the power (battery or electrical power) would be depleted prior to the bitstream being completely decoded (such as during playback), the user has an option to select a power mode that would allow the bitstream to be completed.

As previously mentioned, the 3-phase process 120 can be repeated for the different layers in the compression data format. After each block 126 (corresponding to different layers), a hierarchical set of low power modes are generated for the decoder engine 104 to utilize for power and computational load management of the decoding operations. This can happen on the fly or it may be predetermined for a set of appropriately chosen bitstreams and the decoder calibrated/programmed in advance prior to real-time operations.

Figure 5:
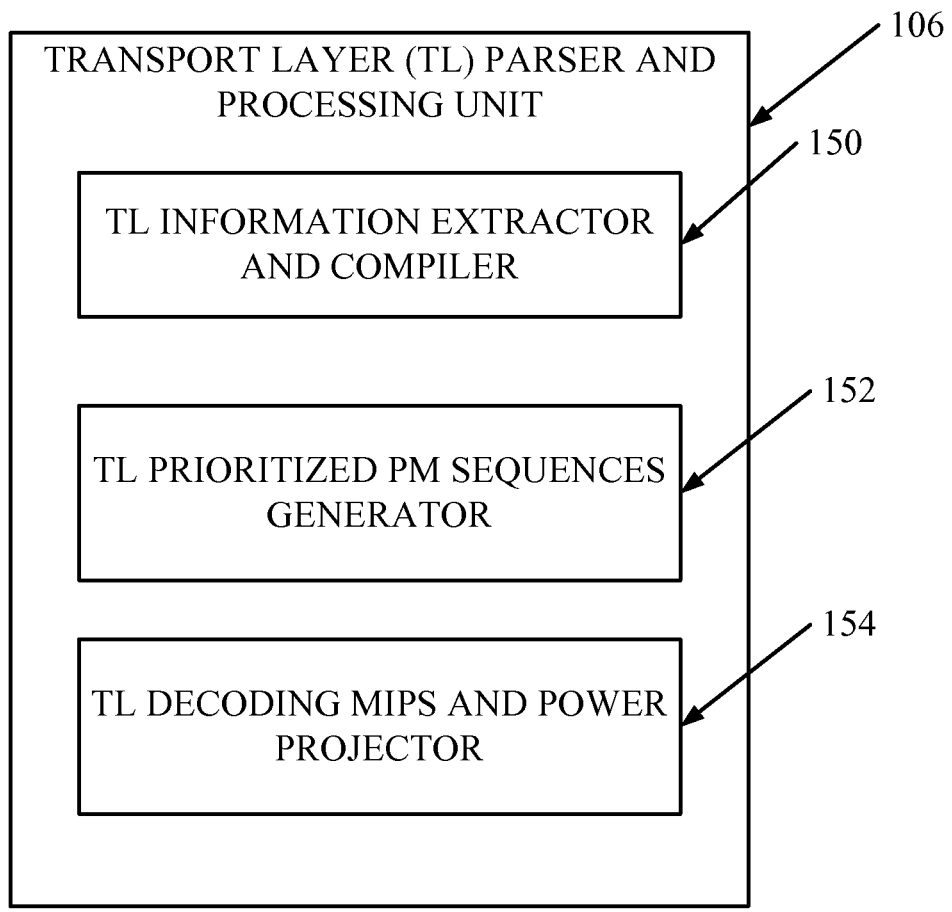
FIG. 5 shows a transport layer (TL) parser and processing unit.

FIG. 5 shows a transport layer (TL) parser and processing unit 106. The TL parser and processing unit 106 includes a TL information extractor and compiler 150 (FIG. 6), a TL prioritized PM sequences generator 152 (FIG. 8) and a TL decoding MIPS and power projector 154 (FIG. 9). The transport layer (TL) parser and processing unit 106 will carryout the three-phase process 120 for use in power and computational load management of the decoding operations for the transport layer 52.

Figure 6:
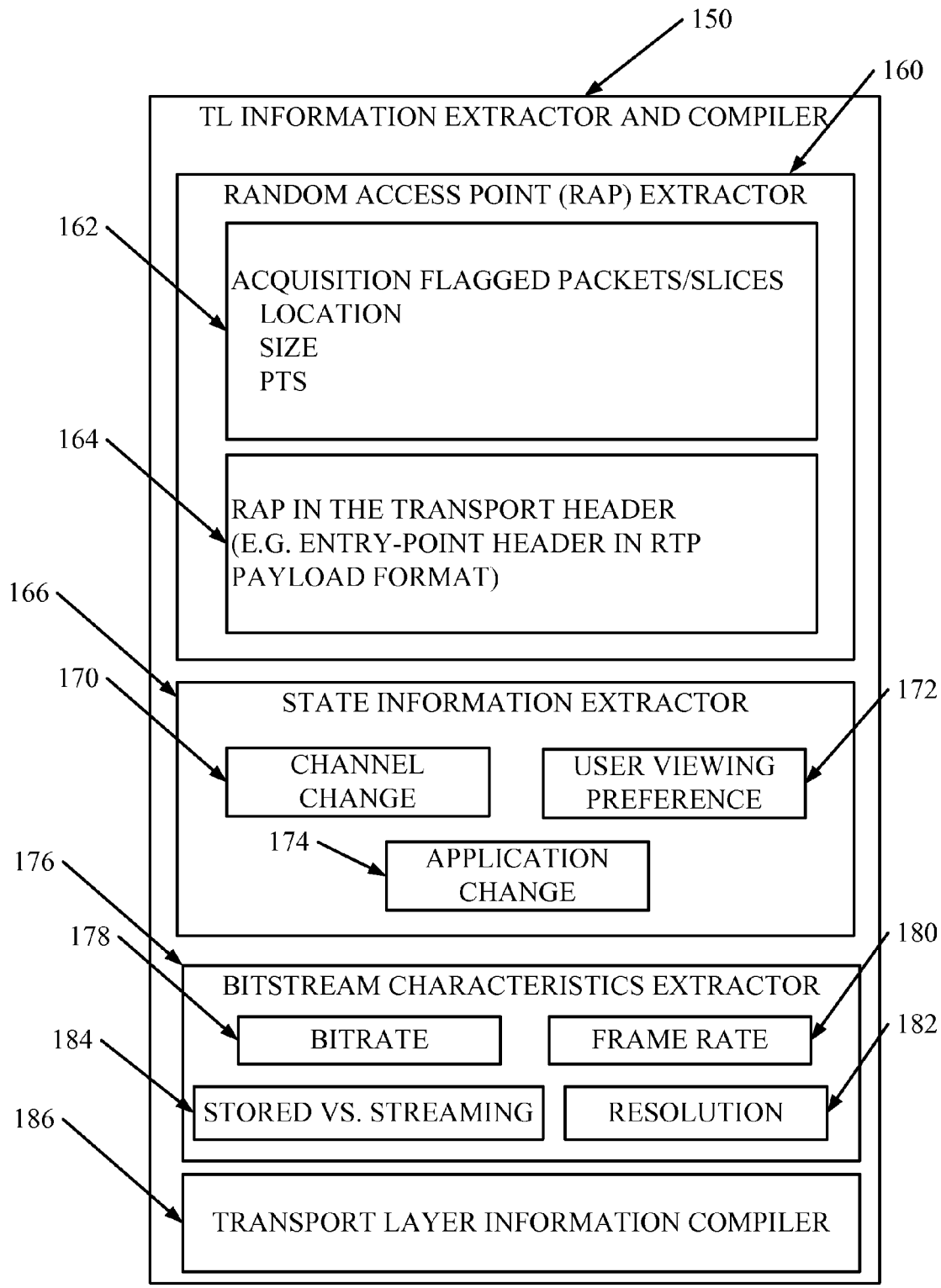
FIG. 6 shows a TL information extractor and compiler.
Figure 7:
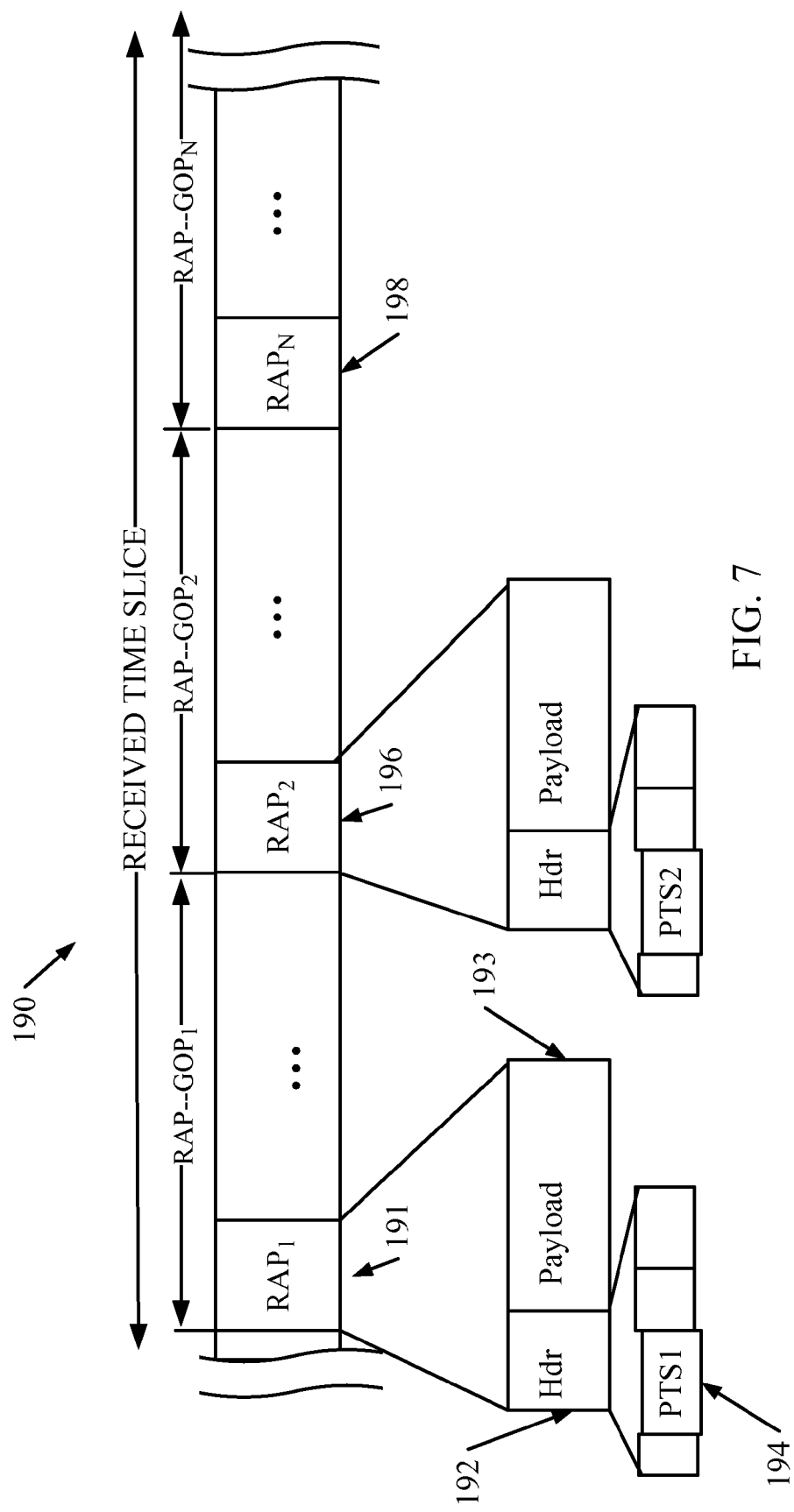
FIG. 7 shows a received time slice.

FIG. 6 shows a TL information extractor and compiler 150. The TL information extractor and compiler 150 depends on the transport protocol over which the video bitstream is received. An example, of a portion of a received time slice 190 is shown in FIG. 7. In the exemplary configuration, the various information in the bitstream can be extracted and compiled by the TL information extractor and compiler 150. The TL information extractor and compiler 150 will parse the received time slice 190 shown in FIG. 7. The TL information extractor and compiler 150 includes a random access point (RAP) extractor 160, a state information extractor 166, a bitstream characteristics extractor 176 and a transport layer information compiler 186. The RAP extractor 160 may extract information 162 having location, size, presentation time stamp (PTS), etc. of packets/slices flagged as acquisition. The RAP extractor 160 may also extract the sequence of RAPs 164 in the transport header (e.g. entry-point header in the real-time transport protocol (RTP) payload format). In the exemplary configuration, the extracted state information, by the state information extractor 166, includes information regarding a channel change 170 and a user viewing preferences 172 (such as in broadcast or mobile TV applications). The extracted state information 166 may also include a change in application 174 (e.g. resolution/preview mode or picture-in-picture mode), etc.

The bitstream characteristics extractor 176 extracts a bitrate 178, a frame rate 180, a resolution 182, an application (stored vs. streaming) 184, etc. In the case of the bitrate 178, values are readily available in some cases (e.g. MPEG file format). In other cases, the bitrate is computed, such as by the transport layer information compiler 186, based on the size of bitstream over a second indicated by time stamps after transport headers and padding are removed. The TL layer information extractor and compiler 150 includes a TL information compiler 186 to compute the information that is not directly extractable from the transport layer of the received time slice. Example calculations for a packet size and bitrate are described in relation to FIG. 9.

FIG. 7 shows the received time slice 190 in this example with $RAP_1$ 191, $RAP_2$ 196, ... $RAP_N$ 198 in the received data. (It could optionally be a section of the bitstream extracted from a stored file). Each RAP, such as $RAP_1$ 191, has a header 192 followed by a payload 193 having data pertaining the coded frame that is the random access point, such as an I-frame. The header includes a plurality of fields, one of which is a $PTS_1$ interval 194. The absolute RAP locations (packets) and PTS values from the $PTS_1$ interval 194 for each RAP are computed (e.g. in RTP, derived from random access (RA) count and reference time and PTS offset). $RAP_2$ 196 has a header followed by a payload having data pertaining to the coded frame that is the random access point, such as an I-frame. The header includes a plurality of fields, one of which is a $PTS_2$ interval.

An interval denoted as RAP-GOP is defined as a group of pictures that begins with a RAP frame until the next RAP frame. At the transport layer, the RAP is a decodable unit. Furthermore, the RAP-GOP may be a decodable unit for the transport layer. Based on the application, more data is retrieved or requested if needed. For example, during playback of stored video, it may be possible to seek through file format headers for a few seconds (2-5 seconds) worth of data to assess the bitrate and frame rate. Then, based on the available power, decide on decoding all of the data or decode toward a reduced frame rate.

The received time slice 190 may be a superframe for MediaFLO™ or a time slice for digital video broadcast (DVB) such as DVB-H (where H stands for handheld).

Figure 8:
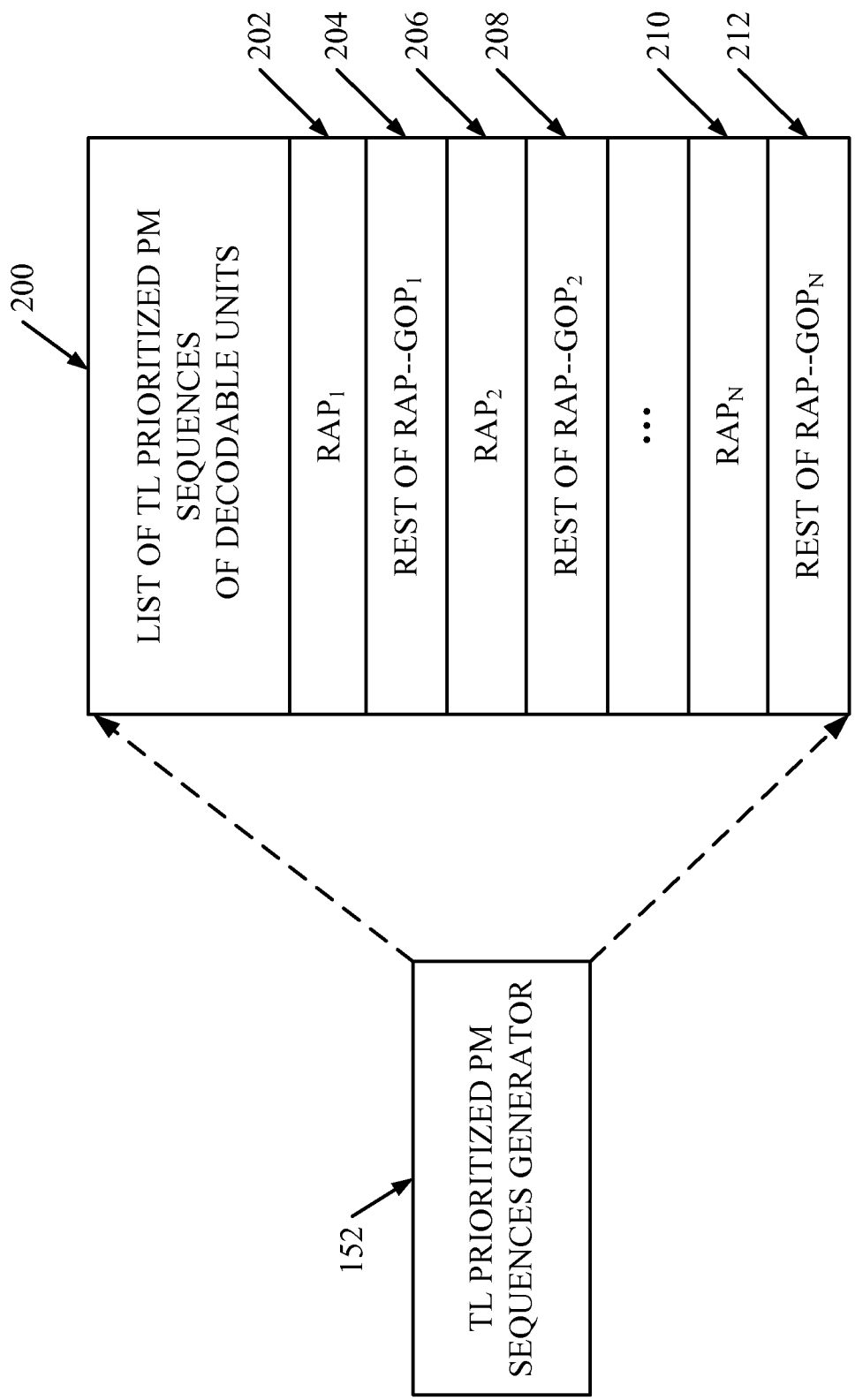
FIG. 8 shows a TL prioritized PM sequences of decodable units generator.

FIG. 8 shows TL prioritized PM sequences generator 152. The information extracted above is processed to create a list of TL prioritized PM sequences of decodable units 200. The TL prioritized PM sequences generator 152 derives absolute parameter values. Assume at the transport layer 52, a plurality of packets $RAP_1$, $RAP_2$, ... $RAP_N$ 191, 196 and 198 with corresponding GOPs have been received. Thus, the TL prioritized PM sequences of decodable units to be decoded by the decoder engine 104 begins with block 202. Here the decodable units are $RAP_1$ at block 202, the rest of $RAP\text{-}GOP_1$ at block 204, $RAP_2$ at block 206, the rest of $RAP\text{-}GOP_2$ at block 208. The prioritizing of TL prioritized PM sequences continues until the decodable unit $RAP_N$ at block 210 and the rest of the $RAP\text{-}GOP_N$ at block 212. The above description of TL prioritized PM sequences of decodable units is just one example of an arrangement of sequences.

FIG. 9 shows a TL decoding MIPS and power projector 154. At the transport level 52, a first level of power/computation load reductions are possible. This level may provide coarse power/computational load reductions. For example, for the lowest power mode setting or when a battery level of device 10 has been depleted to <10%, only the RAP packets (denoted by blocks 202, 206 and 210) would be decoded and, while rendering by the rendering stage 28A, optionally, the graphics processing unit 34 may be triggered to create transition effects between the I-frames. The transition effects provide a low cost "video" instead of a slide show effect. Based on the low power mode, other video compensations may be used to compensate for skipped decodable units. For example, image morphing may be employed. Another example of compensation may employ optical flow.

The TL decoding MIPS and power projector 154 generates data representative of a projection (column 4) for the MIPS to decode one, more or all of the PM sequences of decodable units in the list of TL prioritized PM sequences 200. For illustrative and descriptive purposes only, a MIPS projection table 230 is shown. The table has a plurality of columns. In column C1, the transport layer information or the TL prioritized PM sequences of decodable units are itemized. In column 2, the packet size to decode the some or all of the decodable units is identified. In column C3, the bitrate calculation is identified. In column C4, the projected MIPS to decode the decodable units is provided. As can be appreciated, the bitrate in column C3 and the packet size in column C2 may have been derived during the prioritization phase.

In this example, row R1 identifies a first decodable unit in the list of TL prioritized PM sequences of decodable units 200. In this instance, the first decodable unit is $RAP_1$. The packet size of $RAP_1$ can be calculated based on the extracted and compiled information from the TL extractor and compiler 150. In the exemplary configuration, the decode packet size for $RAP_1$ corresponds to the size of the transport packet for $RAP_1$—the size of (transport header 192 plus the payload 193). The decode packet size for $RAP_2$ corresponds to the size of the transport packet for $RAP_2$—the size of (transport header plus the payload). Likewise, the decode packet size for $RAP_N$ corresponds to the size of the transport packet for $RAP_N$—the size of (transport header plus the payload). In row RN+1 (the last row) corresponds to the entire received time slice, such as slice 190. Thus, a projection of the MIPS is calculated for each decodable unit and all decodable units at row RN+1 for the entire transport layer 52 of the received time slice 190.

In column 3, the bit rate is calculated or extracted. In this case, the bitrate is calculated based on the sizes of RAP, $GOP_1$, $PTS_2$, $PTS_1$ according to the size of the interval ($RAP\text{-}GOP_1$) divided by the size of the interval ($PTS_2-PTS_1$) or ($PTS_2$ minus $PTS_1$). The bitrate for $RAP_2$, . . . $RAP_N$ is calculated in a similar manner as $RAP_1$. In row RN+1, the bitrate is the size of the received time slice/interval($PTS_2-PTS_1$).

In column 4, in row R1, the projected MIPS to decode $RAP_1$ has two values. The first value is a function of the I-frame size for $RAP_1$. The second value is a function of that portion of the bitstream of size ($RAP\text{-}GOP_1$) for the given codec. The information for the projection of the MIP is available from the transport headers (RAP and the corresponding PTS). Thus, the decodable units divisible and are not fully decoded when projecting the MIPS. Instead, only the header or a portion thereof needs to be decoded to extract the necessary information, as will be described in more detail below. In row RN+1, the projected MIPS to decode the entire time slice is projected according to bitstream size (for the time slice) for the given codec. It should be noted that the MIPS projection to decode for the specified quantity is a function of power profiling and analysis.

For each of the MIPS projection in column C4, a corresponding power requirement can be determined. The corresponding power can be calculated as needed or may be pre-stored in a lookup table. This will generally complete the third phase of the three-phase process 120.

Figure 10:
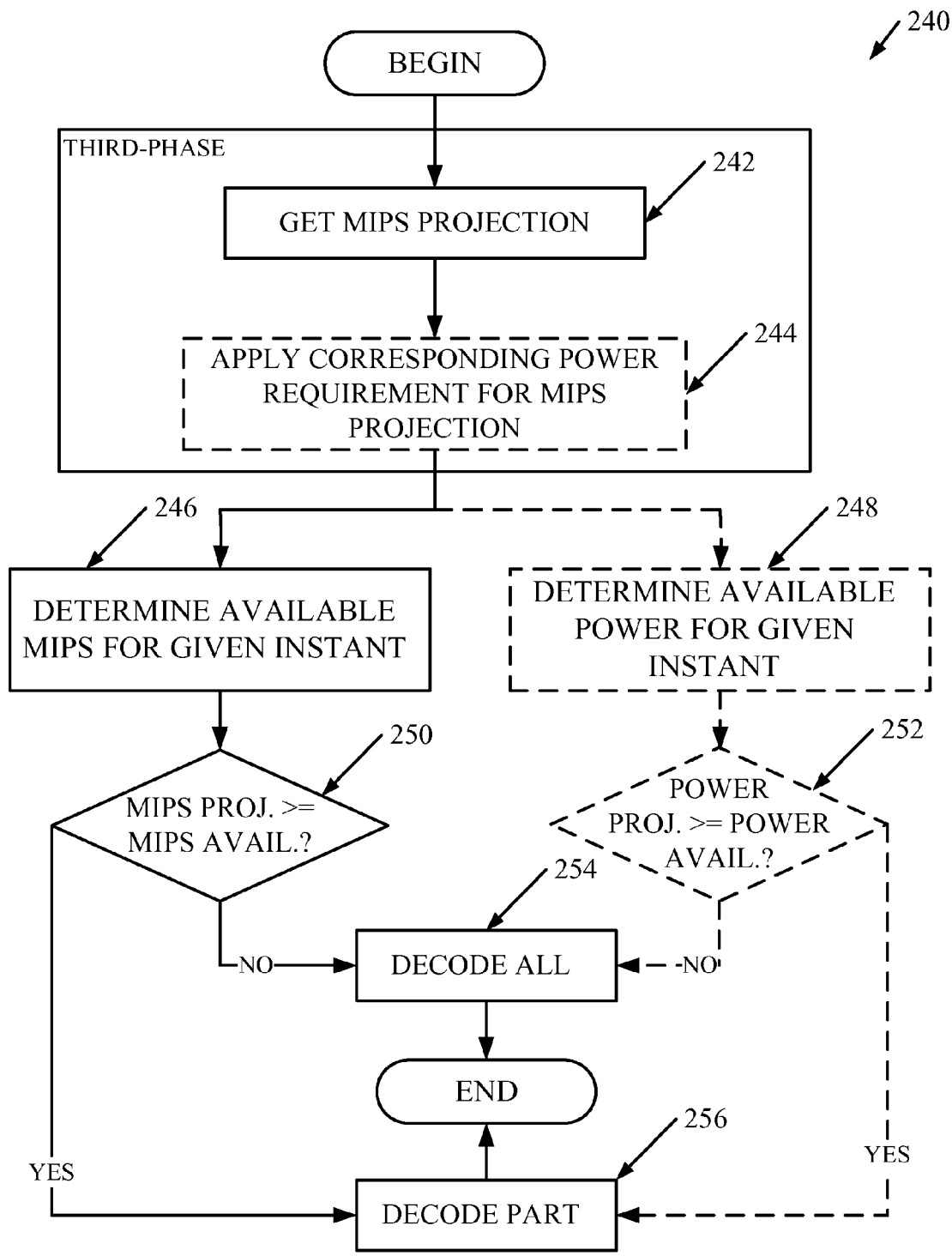
FIG. 10 shows a process for decoding with power and computational load management.

FIG. 10 illustrates a process 240 for decoding with power and computational load management. Given the MIPS requirement to decode one or more of the decodable units, and the available MIPS at a given instant, (or power requirement vs. available power/amps), the decision to decode all or part of the received time slice 190 can be made. The process 240 is illustrated with the third phase of process 120 shown in phantom. The third phase of the process 120 provides the necessary projections for computational loads and/or power necessary to decode the transport layer 52. Thus, at block 242, the MIPS are projected. At block 244, the power corresponding to the projected MIPS is determined. While the exemplary configuration provides for a MIPS and power relationship, other values which affect the power and computational loads may be employed.

Block 244 ends the third phase. Block 244 is followed by blocks 246 where the available MIPS (computational load) for a given instant is determined. Block 244 is also followed by block 248 where the available power is determined for a given instant. Blocks 246 and 248 are shown in parallel. Nonetheless, in various configurations, the blocks of the process 240 and other processes described herein are performed in the depicted order or at least two of these steps or portions thereof may be performed contemporaneously, in parallel, or in a different order.

Block 246 is followed by block 250 where a determination is made whether the projected MIPS is greater than the available MIPS. If the determination is "No," meaning the available computation load at the instant is sufficient, then all of the transport layer 52 can be decoded at block 254. However, if the determination at block 250 is "Yes," meaning the available computation load is insufficient, then part of the transport layer 52 can be decoded in accordance with any of the modes identified in the list of low power mode settings 260 (FIG. 11) at block 256.

Figure 11:
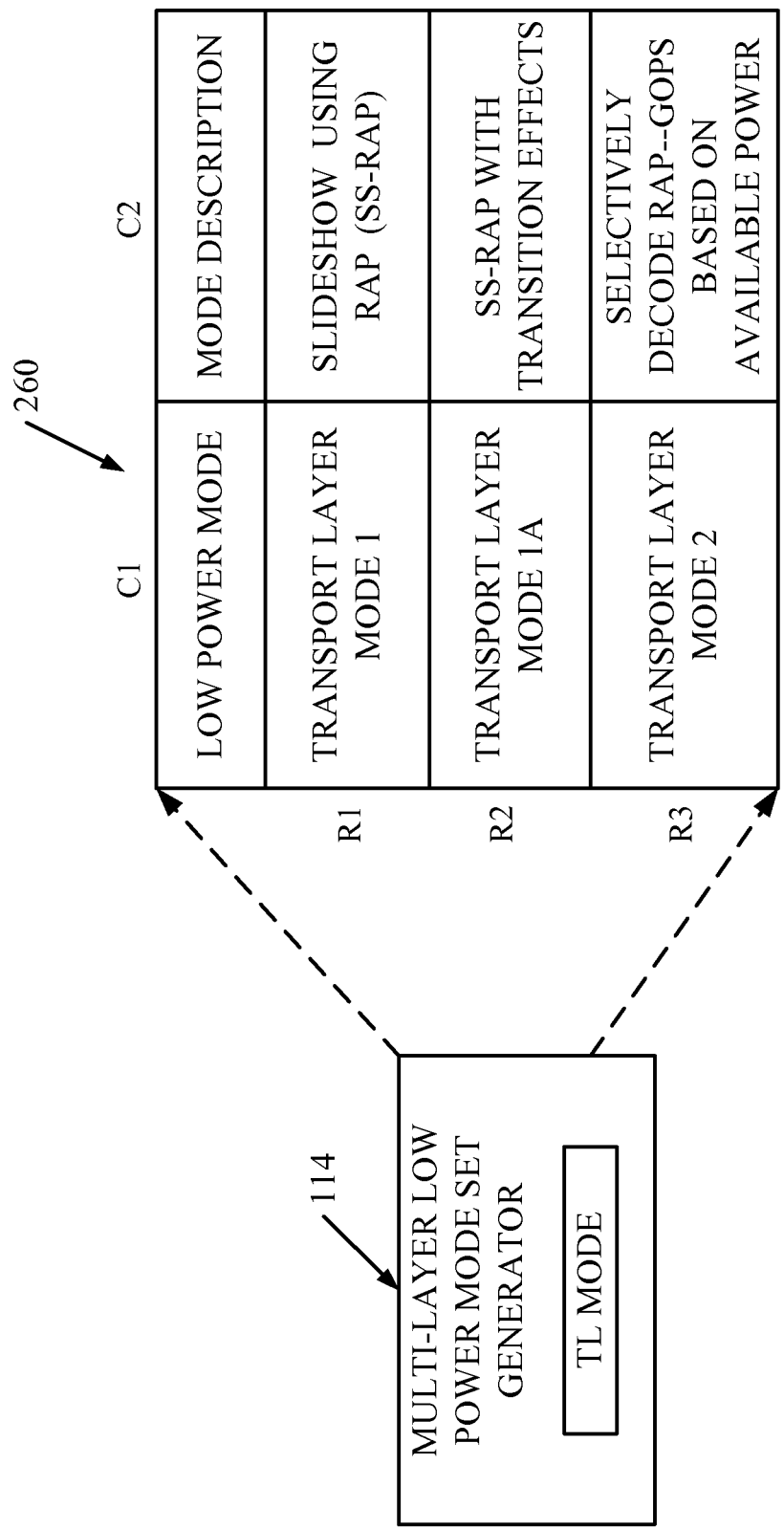
FIG. 11 shows a multi-layer low power mode set generator during the TL mode.

Block 248 is followed by block 252 where a determination is made whether the projected power is compared to the available power. If the determination at block 252 is "No," meaning that the available power is sufficient, then all of the transport layer 52 may be decoded. However, if the determination at block 252 is "Yes," meaning the available power is insufficient, then part of the transport layer 52 can be decoded at block 256 in accordance with any of the modes identified in list of low power mode settings 260 (FIG. 11). All of the transport layer 52 would be decoded if both conditions from blocks 250 and 252 are No. The transport layer 52 would be decoded in part for all other cases. The blocks 248, 252 are shown in phantom to denote that they are also optional.

FIG. 11 shows a multi-layer low power mode set generator 114 during the TL mode. The multi-layer low power mode set generator 114 generates a list of selectable low power mode settings 260. In the exemplary configuration of FIG. 11, there are a plurality of transport layer low power modes denoted as mode 1 in row R1, mode 1A in row 2 and mode 2 in row 3. The transport layer mode 1 corresponds, for example, to a slideshow using all the RAPs (hereinafter referred to as "SS-RAP"). The transport layer mode 1A corresponds to the SS-RAP with transition effects by the rendering stage 28A. Thus, mode 1A differs from mode 1 in that mode 1A provides an enhanced visual quality over mode 1. The transport layer mode 2 corresponds to selectively decoding RAP-GOPs based on the available power. The list in column C2 would provide the necessary instruction to cause the decoder engine 104 to selectively decode one or more of the decodable units at the transport layer 52.

The power management module 100 during the TL mode makes a determination based on the projected MIPS and/or power which one low power mode 1, 1A or 2 can be afforded to the user for the decoding of the bitstream. Mode 2 may be selected if there is available power which may be further conserved based on managing the power of other layers of decodable units, as will be described in relation to the video sequence/picture layer.

If TL mode 1A is selected, normal decoding of the SS-RAPS (I-frames) with transition effects takes place. However, if TL mode 1 is selected, the power management module 100 may proceed to VS/PL mode 3 for further upgrades in visual quality.

Sequence/Picture Layer

Figure 12:
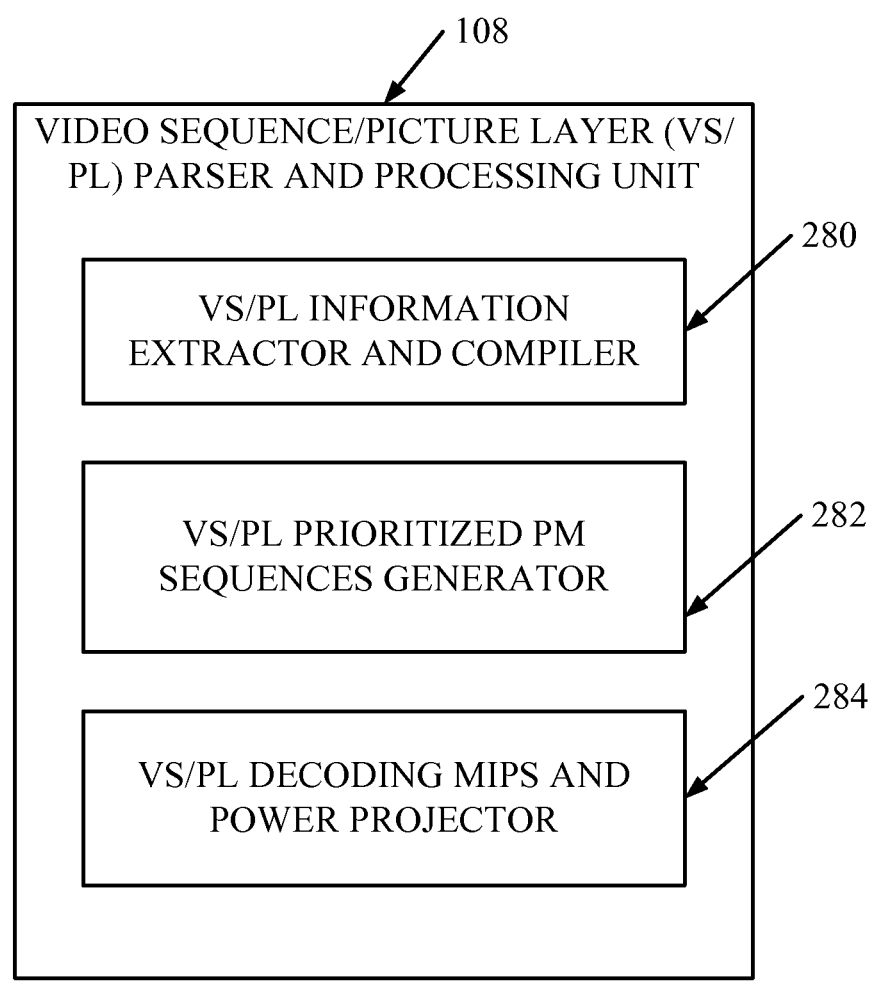
FIG. 12 shows a video sequence/picture layer (VS/PL) parser and processing unit.
Figure 17:
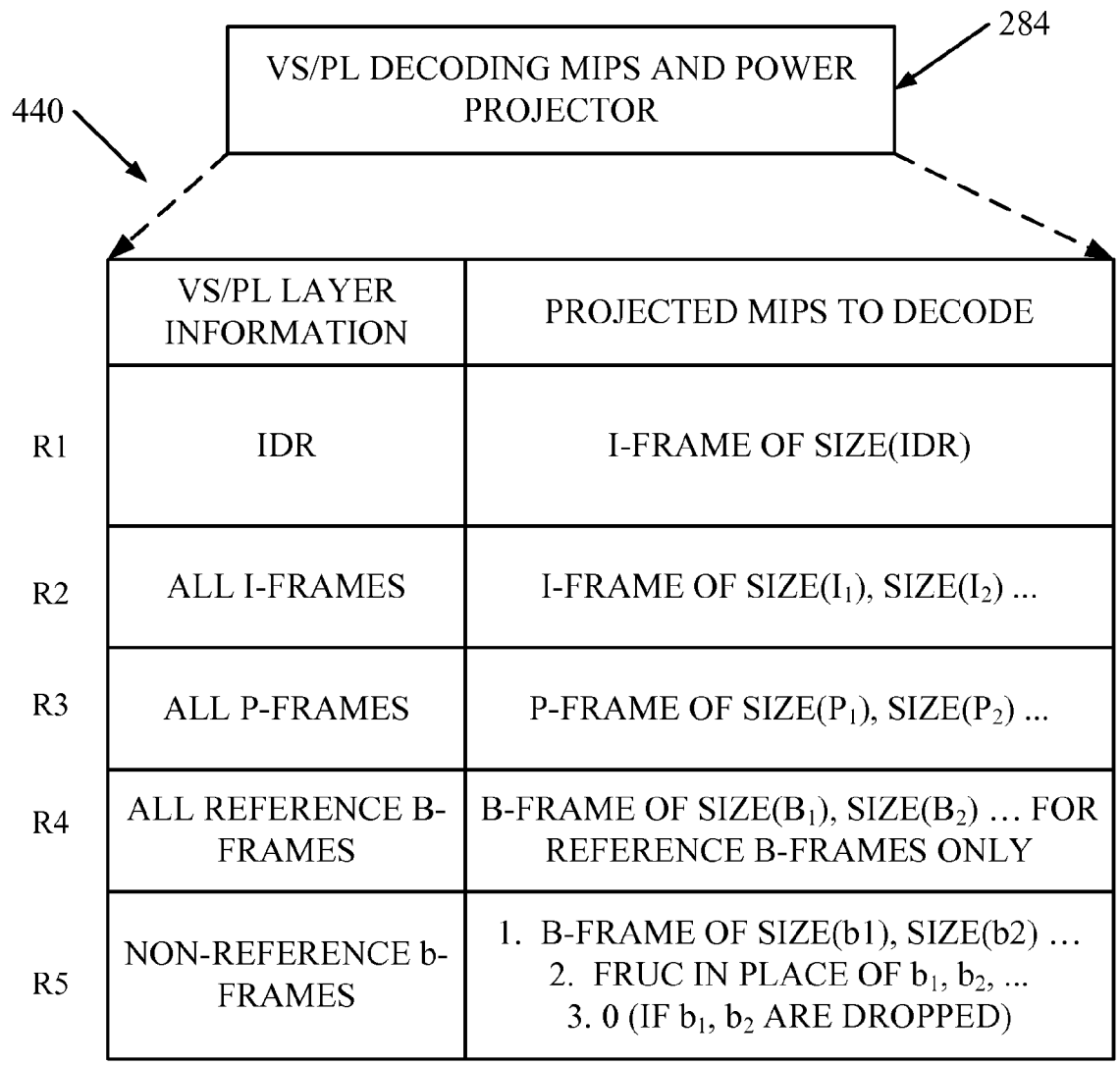
FIG. 17 shows a VS/PL decoding MIPS and power projector.

FIG. 12 shows a video sequence/picture layer (VS/PL) parser and processing unit 108. The VS/PL parser and processing unit 108 includes a VS/PL information extractor and compiler 280 (FIG. 13), a VS/PL prioritized PM sequences generator 282 (FIG. 15) and a VS/PL decoding MIPS and power projector 284 (FIG. 17). The VS/PL parser and processing unit 108 will carryout the three-phase process 120 for use in power/computational load management of the decoding operations for the VS/PL 70.

Figure 13:
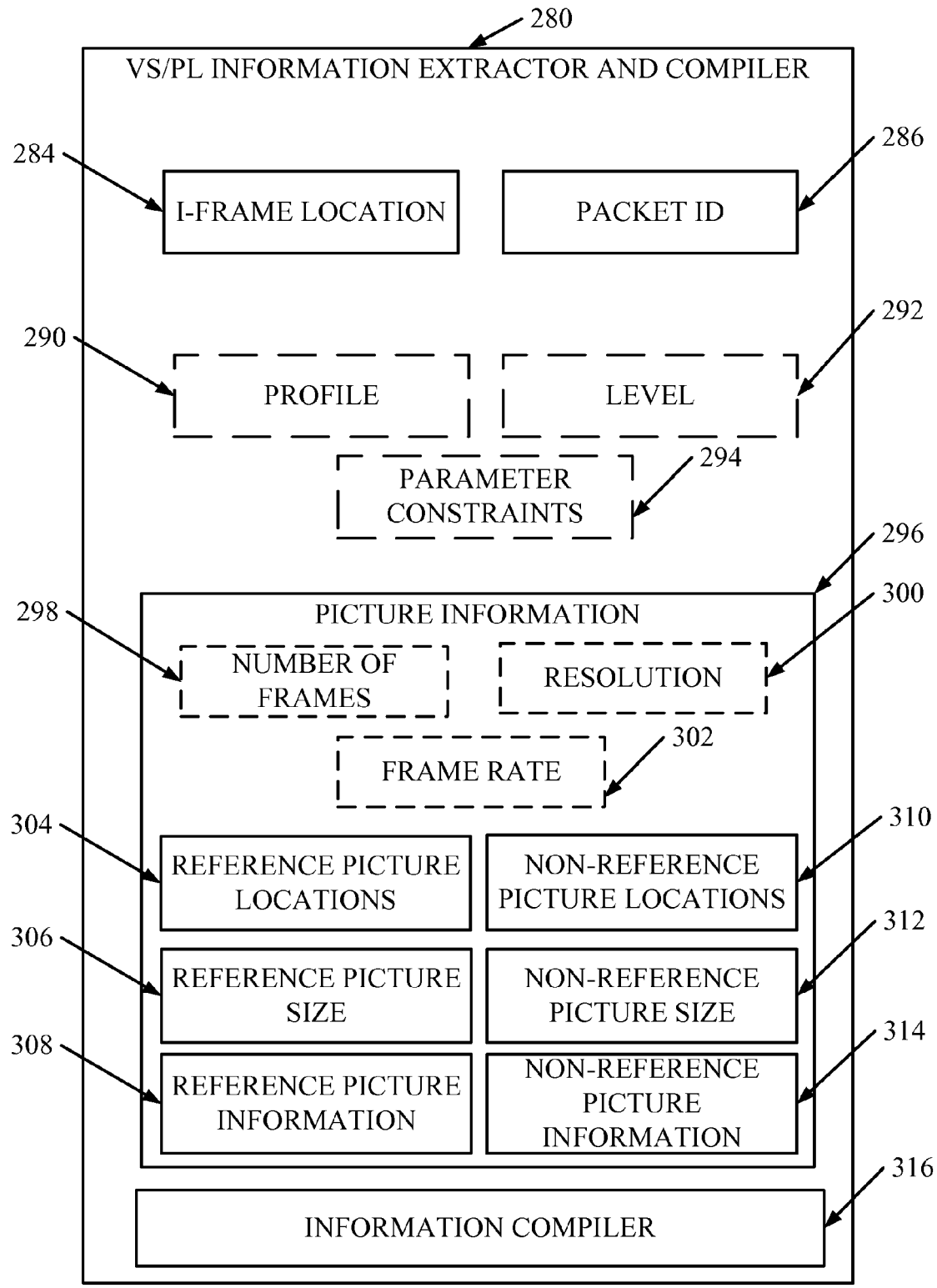
FIG. 13 shows a VS/PL extractor and compiler.
Figure 14:
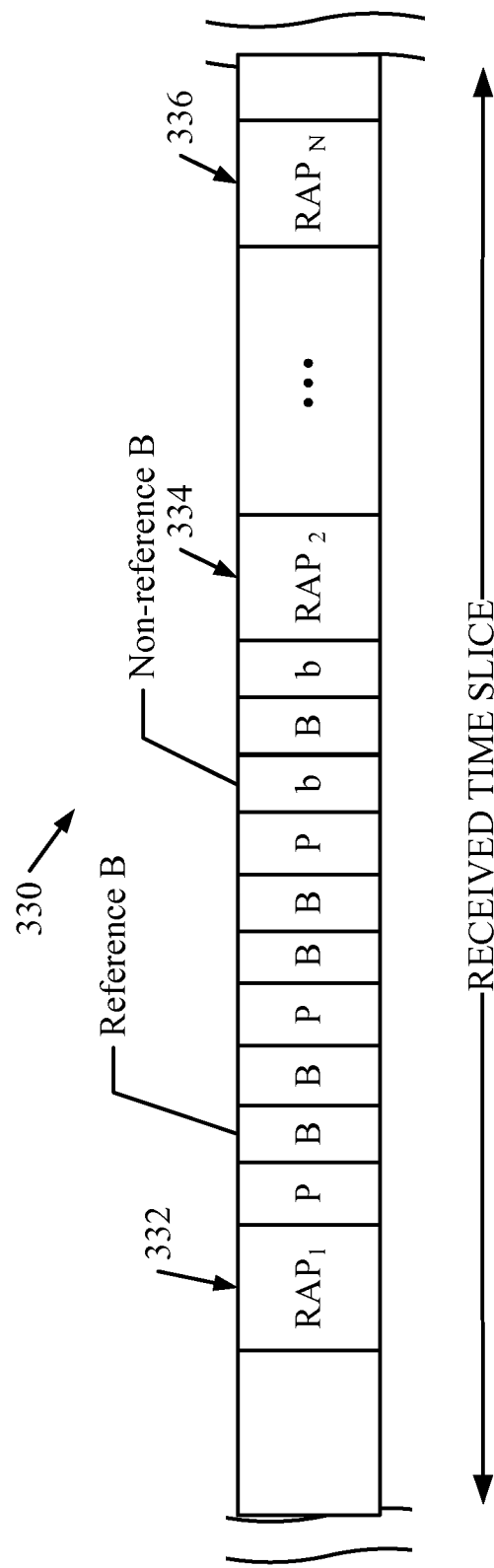
FIG. 14 shows VS/PL information in a received time slice.

FIG. 13 shows a VS/PL information extractor and compiler 282. The VS/PL information extractor and compiler 282 depends on the VS/PL format of the video bitstream. An example, of a received time slice 330 according to the VS/PL 70 is shown in FIG. 14. Based on the video codec (encoder engine and decoder engine), information is extracted at the sequence layer 54. In the case of MPEG-2 and MPEG-4, the video sequence layer parameters are extracted. This requires an interface into the video decoder engine 104. The extraction will be described later in relation to FIGS. 27 and 28.

If some parameters listed at the transport layer 52 could not be retrieved (e.g. I-frame locations or packet ID), such information may be extracted at the sequence layer 54. The VS/PL information extractor and compiler 280 extracts the I-frame location 284 and the packet ID 286. The VS/PL information extractor and compiler 282 also extracts a profile 290, a level 292, and parameter constraints (constrained_set_flags) 294 from the sequence parameter set (SPS) such as for the H.264 standard or the sequence layer 54. The picture parameter set (PPS) may also be used.

The VS/PL information extractor and compiler 282 may also extract or compile picture information 296. The picture information may include a number of reference frames 298, resolution 300, frame rate 302 (if not already retrieved), display parameters (VUI), etc. to assess the computational load required to decode/process the data. Additional information includes information regarding reference location 304, reference picture size 306, PTS and reference picture information 308. Non-reference picture locations 310, non-reference picture size 312, non-reference picture information 314 and the PTS also may be extracted or compiled. An information that is compiled is complied by the information compiler 316. In order to extract the VS/PL information, the sequence header and all picture headers are decoded only. The payload of the picture is left un-decoded, as will be described in more detail in FIGS. 27 and 28.

Figure 15:
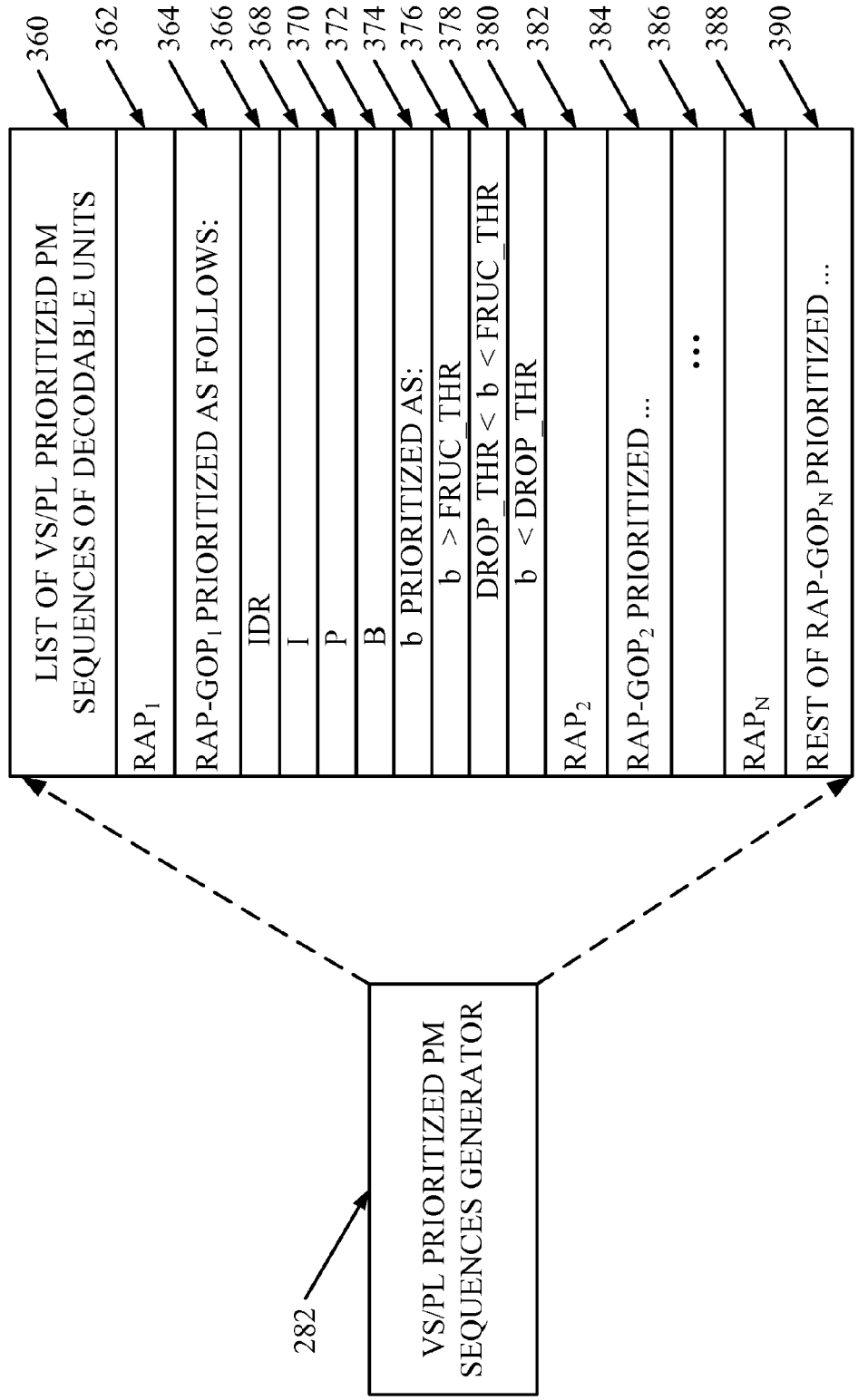
FIG. 15 shows a VS/PL prioritized sequence to decode generator.

FIG. 15 shows a VS/PL prioritized PM sequences generator 282. At the VS/PL prioritized PM sequences generator 282 absolute parameter values are derived from the extracted information. The list of VS/PL prioritized PM sequences of decodable units 360 is populated with more details for improved granularity. The prioritization is similar to that discussed in relation to FIG. 8. At this level or layer, however, the plurality of packets $RAP_1$, $RAP_2$, ... $RAP_N$ (blocks 362, 382, 388) identified in the transport layer 52 are further qualified or prioritized based on the type of I-frame such as IDR and I-frame in the case of H.264. Alternatively, all I-frames are identified using the picture header information and are then prioritized.

In the exemplary configuration, the block or interval $RAP\text{-}GOP_1$ 364 is further sub-divided into other VS/PL decodable units. These VS/PL decodable unit are further prioritized such that IDRs (or I-frames at the beginning of a closed GOP in MPEG-2) are followed by a non-IDR I-frames (open GOP). Hence, prioritization may be set so that IDR-frames 366 are followed by I-frames 368. I-frames 366 are followed by P-frames 370 which are followed by reference B-frames 372. The reference B-frames 372 are then followed by non-reference B-frames denoted as b-frames 374. FIG. 14 shows a received time slice 330 indicating frame types (P, B and b).

Thus, the VS/PL prioritized PM sequences to be decoded by the decoder engine 104 begins with $RAP_1$ at block 362 which is followed the $RAP\text{-}GOP_1$ at block 364. The $RAP\text{-}GOP_1$ is further prioritized according to blocks 366, 368, 370, 372 and 374. The interval corresponding to the $RAP\text{-}GOP_1$ can be further prioritized based on the b-frame. In the exemplary configuration, the VS/PL prioritized PM sequence is further prioritized using size information for b-frames at blocks 376-380. For example, b-frames having a size information larger than the FRUC threshold, denoted as, FRUC_THR, (block 376) may have a higher priority than those b-frames with a size which is less than the FRUC threshold. Additionally, b-frames smaller than a Drop threshold, denoted as DROP_THR, may be flagged and dropped entirely with no FRUC. Thus, at block 378, the prioritization criteria may be set as DROP_THR<b<FRUC_THR. At block 380, the prioritization criteria may be set as b<DROP_TH. These thresholds can be mapped to percentage reduction in processing cycles/power required.

Block 382 sets the prioritization for decoding $RAP_2$. Block 384 is followed by block 382 where the prioritization for the rest of the $RAP\text{-}GOP_2$ is prioritized similar to blocks 366, 368, 370, 372, 374, 376, 378 and 380 above. The prioritization of the VS/PL prioritized PM sequences continue at block 386 until block 388 for prioritizing the decoding of $RAP_N$. Block 388 is followed by block 390 where the rest of the $RAP\text{-}GOP_N$ is prioritized for decoding.

Depending on a status of the computational load, the sequence of decoding operations may be reduced or modified through elimination of an appropriate number of low priority sequences or selectable decodable units.

Figure 16:
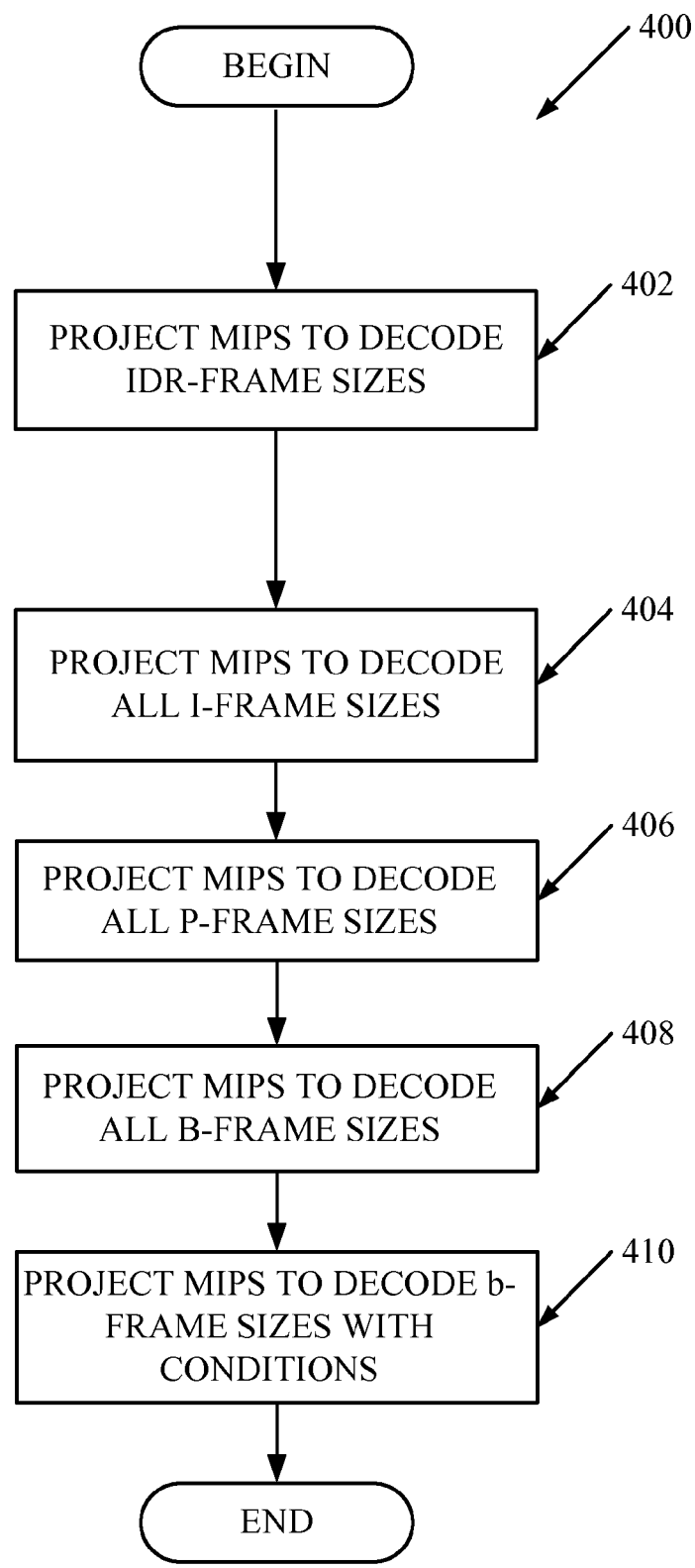
FIG. 16 shows a flowchart of a process to estimate MIPS by the VS/PL decoding MIPS and power projector.

FIG. 16 shows a flowchart of a process 400 to project MIPS by the VS/PL by the VS/PL decoding MIPS and power projector 284. The process 400 begins with block 402 where MIPS to decode an IDR-frame sizes are determined. Block 402 is followed by block 404 where the MIPS to decode all I-frames sizes are determined. Block 404 is followed by block 406 where the MIPS to decode all the P-frames sizes are determined. Block 406 is followed by block 408 where the MIPS to decode all B-frames sizes are determined. Block 408 is followed by block 410 where the MIPS to decode all b-frames sizes is determined with various conditions. For example, if some of the b-frames (such as a $b_1$ frame and $b_2$ frame) are dropped, the projected MIPS to decode is set to 0.

FIG. 17 shows a VS/PL decoding MIPS and power projector 284. At the frame level; frame type (such as IDR, I, P, B, b ...), size (306 or 312) and the frame rate 302 are key factors (other qualifiers may be included), that can be used to assess the amount or proportion of processor cycles required to decode them. Power profiling and analysis using specific test bitstreams can be used to derive a relationship between the amount of processor cycles and frame size based on frame type (IDR, I, P, B, b ...). These relationships may be arranged in a lookup table for later use in the MIPS and power projections. Other conditions may be fixed during this analysis and extrapolated later. For example, the mapping may be derived for 1-reference picture scenario and relative complexity vs. 5-reference pictures may be extrapolated based on independent analysis. In the case of the H.264 standard, frame level information is not available until slice headers are parsed.

In FIG. 17, the VS/PL decoding MIPS and power projector 284 generates a list of projected MIPS to decode 440. The list is generated for illustrative and descriptive purposes. At row R1, the VS/PL decoding MIPS and power projector 284 projectors for the IDR-frames based on the size(IDR) of each IDR. At row R2, the VS/PL decoding MIPS and power projector 284 generates the projected MIPS for all I-frames based on a sequence of sizes I-frame sizes (size($I_1$), size($I_2$), ...). At row R3, the VS/PL decoding MIPS and power projector 284 generates the projected MIPS for all P-frames based on P-frame sizes (size($P_1$), size($P_2$), ...). At row R4, the VS/PL decoding MIPS and power projector 284 generates the projected MIPS for all B-frames based on B-frame sizes (size($B_1$), size($B_2$), ...). At row R5, the VS/PL decoding MIPS and power projector 284 generates the projected MIPS for all B-frames (non-reference B-frames) based on B-frame sizes (size($b_1$), size($b_2$), ...). When projecting the MIPS for all b-frames, a determination is made whether $b_1$ and $b_2$ are dropped. If so, then the projected MIPS is set to zero (0). There is also a projection in relation to FRUC in place of b1, b2, ..., etc.

In relation to FIGS. 10 and 17, for each of the MIPS projections in the list of projected MIPS to decode 450, a corresponding power requirement is applied. Given the MIPS requirement, and the available MIPS at a given instant, (or power requirement vs. available power/amps), the decision to decode all or selected frames (part), which are decodable units, can be made in a similar manner as described above in relation to FIG. 10.

At the end of sequence/picture level processing, medium granularity power reduction modes are possible (reductions from 0-60% in steps of ~5% are possible—assuming that an I-frame typically constitutes 30% of bits in a GOP and the number of bits is proportional to the MIPS requirement). Depending on feedback on current status of processor load and power levels, the sequence of operations is shortened through elimination of appropriate number of low priority entities. Modes possible at the sequence/picture layer are listed in FIG. 18 in order of increasing power requirements.

Figure 18:
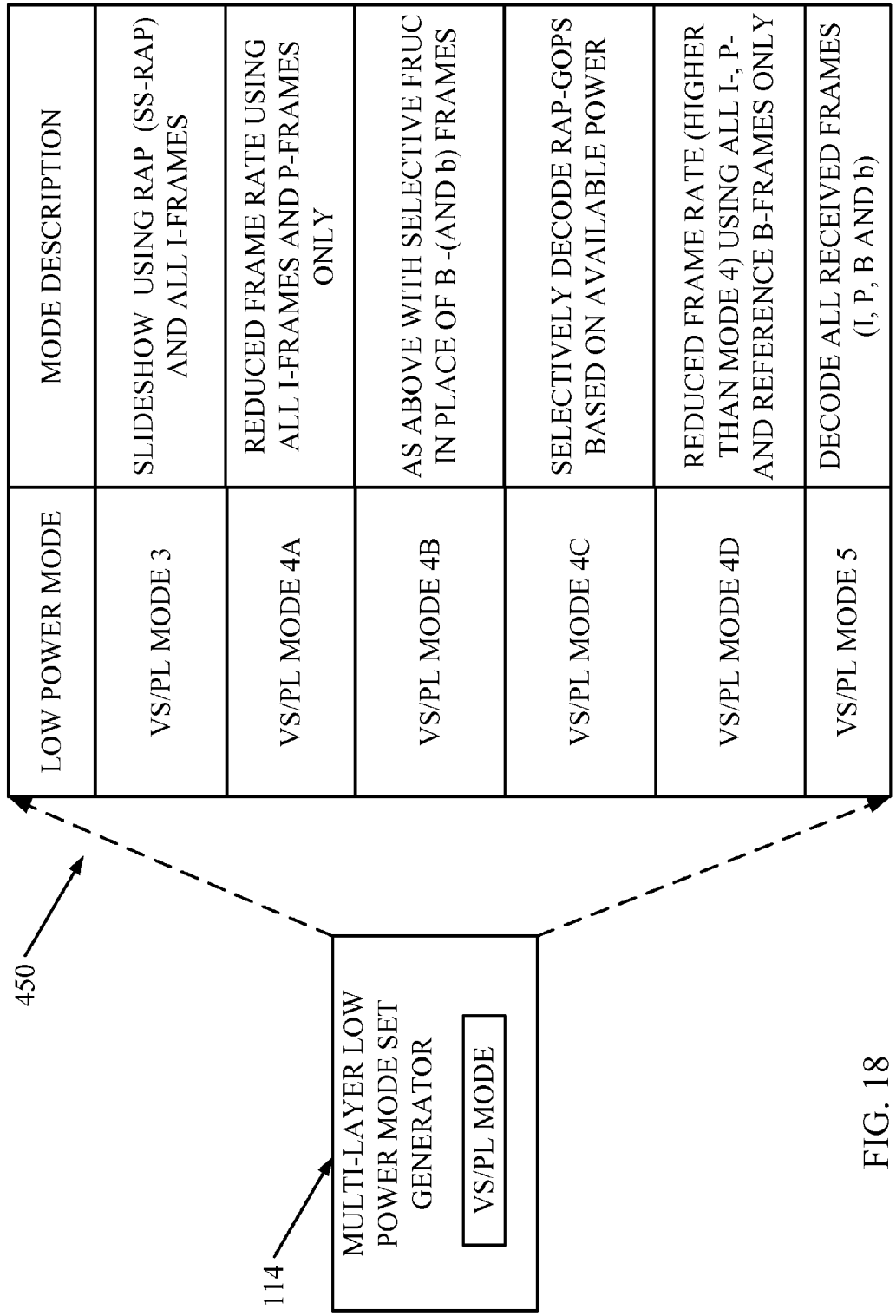
FIG. 18 shows a multi-layer low power mode set generator during the VS/PL mode.

FIG. 18 shows a multi-layer low power mode set generator 114 during the VS/PL mode. The multi-layer low power mode set generator 114 generates a list of low power modes 450. The list is generated for illustrative purposes. The list includes a VS/PL Layer Mode 3 corresponding to instructions to decode a Slideshow using RAPS and all I-frames. Thus, if mode 1A is selected, the power management module 100 would evaluate if additional MIPS are available such that all of the I-frames may also be decoded for improved visual quality or granularity. VS/PL Layer Mode 3 is followed by a VS/PL Layer Mode 4A corresponding to instructions to decode based on a reduced frame rate using all I-frames and P-frames only. VS/PL Layer Mode 4A is followed by VS/PL Layer Mode 4B corresponding to instructions to decode based on a reduced frame rate using all I-frames and P-frames only with selective FRUC in place of B-(and b) frames. At mode 4B, the I and P-frames are decoded using normal decoding. However, the B-frames are not decoded. Instead, selective FRUC is substituted in place of each B or b-frame for all B or b-frames. VS/PL Layer Mode 4B is followed by VS/PL Layer Mode 4C corresponding to instructions to selectively decode RAP-GOPs based on available power such as the I-frames and P-frames as above. However, as an alternate operation, the selective FRUC is used in place of each B or b-frame for a selective number of B or b-frames. VS/PL Layer Mode 4C is followed by VS/PL Layer Mode 4D corresponding to instruction to decode based on a reduced frame rate (higher than mode 4C) using all I and P-frames. All B-frames may be also included. Alternately, and the selective FRUC is used in place of each B-frame (optionally for selective number of B-frames) and no operation is used for the b-frames. Alternately, the b-frames may be skip or by-passed. VS/PL Layer Mode 4D is followed by VS/PL Layer Mode 5 corresponding to instructions to decode all received frames (I, P, B and b).

If the VS/PL Layer mode 3 or 5 was selected, a further alternate operation would be to replace with skip macroblocks (MBs). Furthermore, from mode 2, further enhanced visual quality or granularity may be achieved by the refinements afforded by the modes 4A-4D and 5.

Slice/MB Layer

Figure 19:
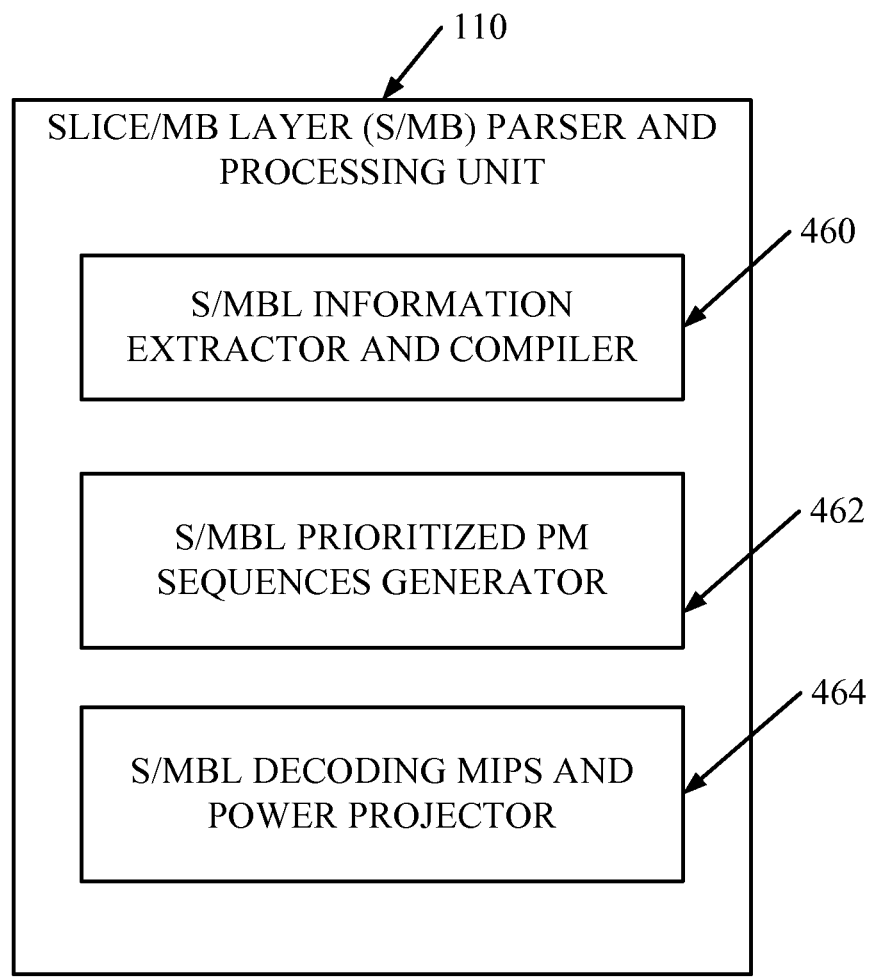
FIG. 19 shows a slice/macroblock layer (S/MBL) parser and processing unit.

FIG. 19 shows a slice/macroblock layer (S/MBL) parser and processing unit 110. The S/MBL parser and processing unit 110 includes a S/MBL information extractor and compiler 460 (FIG. 20), a S/MBL prioritized PM sequences generator 462 (FIG. 21) and a S/MBL decoding MIPS and power estimator 464. The S/MBL parser and processing unit 110 will carryout the three-phase process 120 for use in power/load management of the decoding operations for the S/MBL 72.

Figure 20:
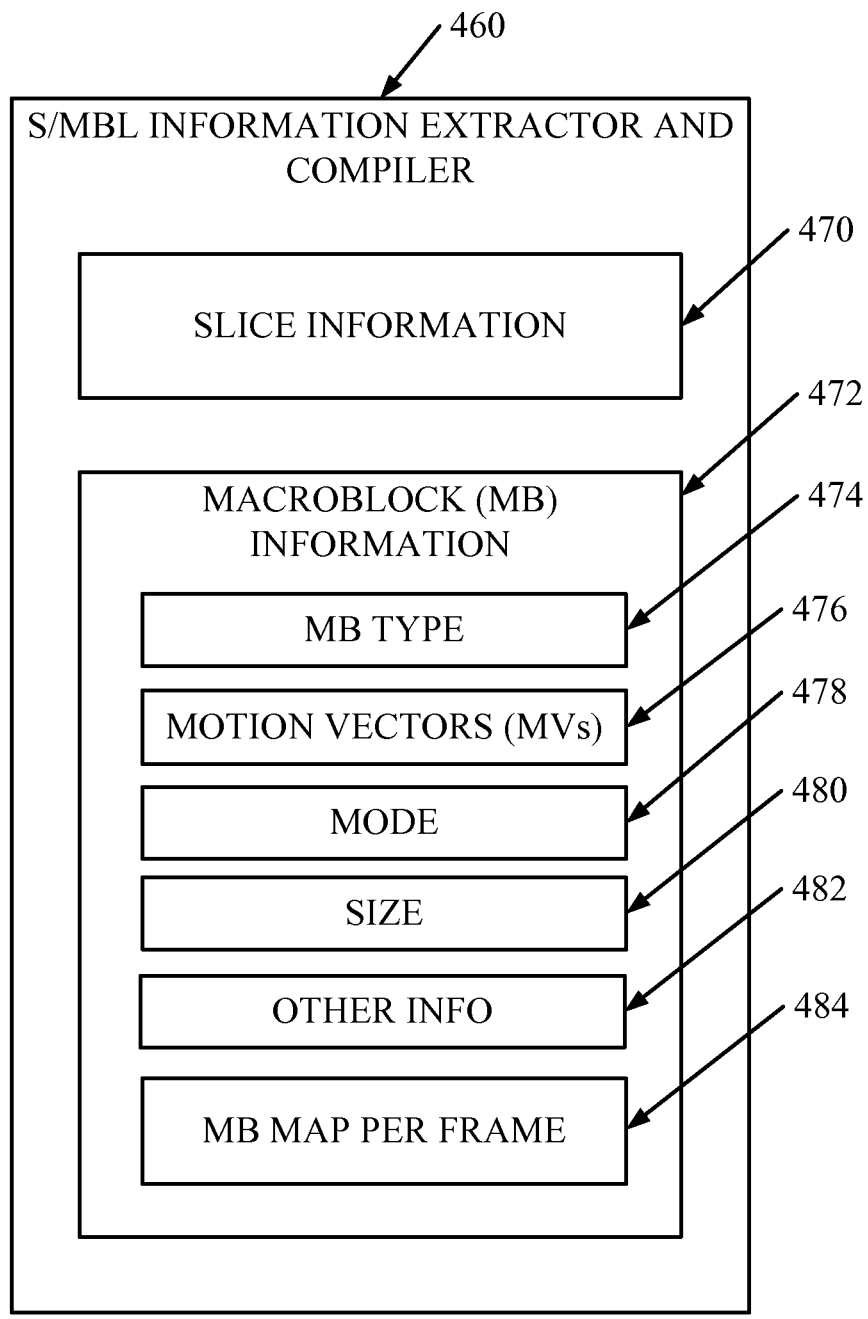
FIG. 20 shows an S/MBL extractor and compiler.

FIG. 20 shows a S/MBL information extractor and compiler 460. The S/MBL information extractor and compiler 460 depends on the protocol or standard for which the video bitstream has been compressed. Here, the S/MBL information extractor and compiler 460 extracts slice information 470 and MB information 472. Slice information 470 and MB headers are parsed for the pictures corresponding to those identified in the prioritized sequence from FIG. 15. A select portion of the frames from the prioritized sequence (FIG. 15) in the previous layer VS/PL 70 might be flagged to be decoded. Note that, decoding may continue for all pictures if finer granularity of power management is required. Thus, only the slice headers and MB headers are decoded.

If headers are detected to be in error, coefficient/MB data for the MB or entire slice may be discarded. Optionally, zero MV concealment may be applied and refined later with more sophisticated error correction (EC). The MB information 472 includes MB type 474, motion vectors (MVs) 476, mode 478, size 480, other information 482 and MB maps per frame 484.

An exemplary MB maps per frame is described in patent application Ser. No. 12/145,900 filed concurrently herewith and is incorporated herein by reference as if set forth in full below.

Figure 21:
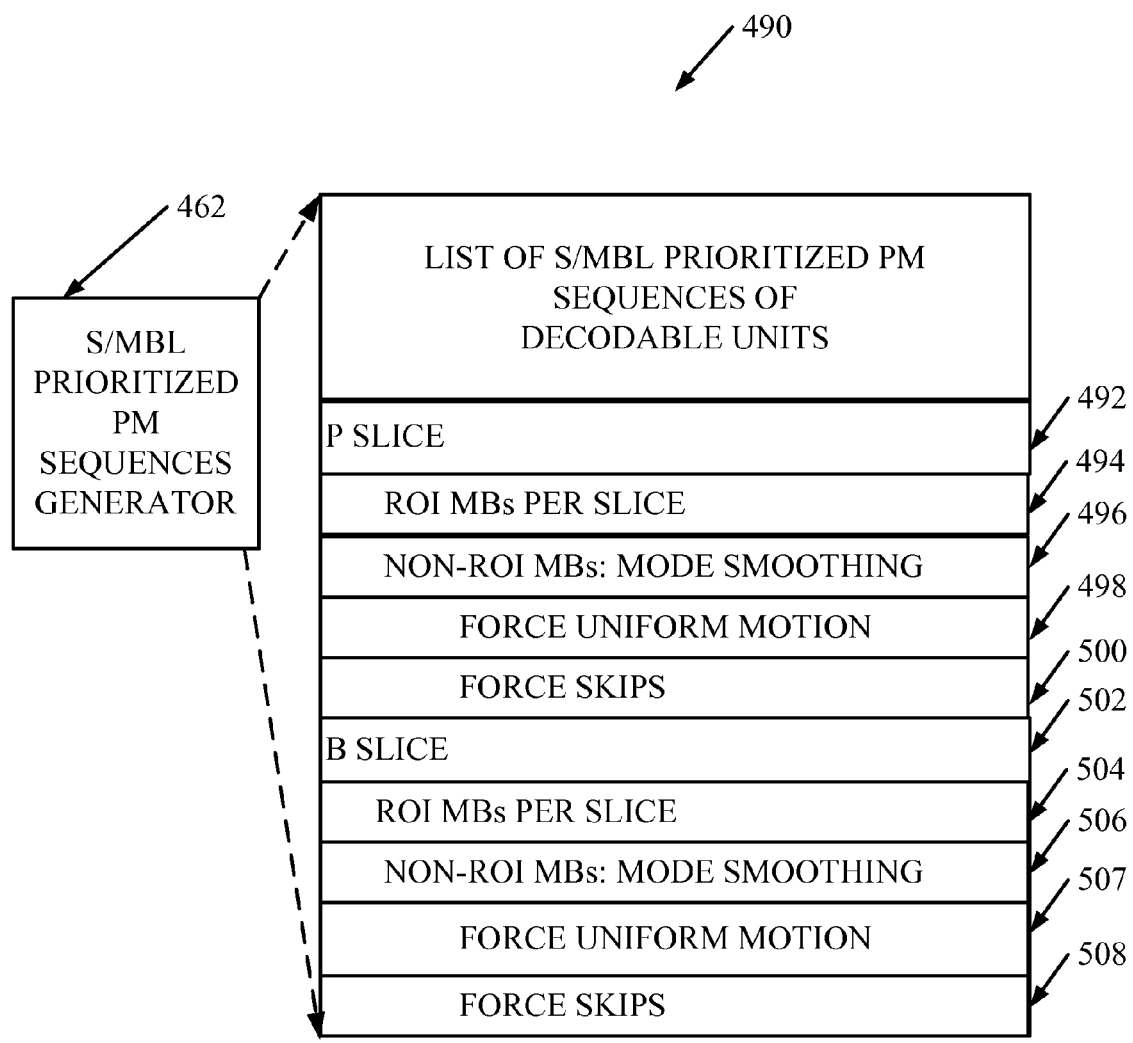
FIG. 21 shows an S/MBL prioritized sequence to decode generator.

FIG. 21 shows a S/MBL prioritized PM sequences generator 462. The list of S/MBL prioritized PM sequences 490 uses the slice information and MB maps to estimate the complexity of each frame in the prioritized list in FIG. 15. In one configuration, only P-frame slices at block 492 and B-frame slices at block 502 are further prioritized. At the previously layer, all I-frames are to be decoded for any selected mode in the VS/PL. The P-frame slices are further prioritized based on the ROI MBs per slice at block 494 and Non-ROI MBs with mode smoothing at block 496. The mode smoothing is further prioritized according to forced uniform motion at block 498 and forced P-skips at block 500. The B-frame slices are further prioritized based on the ROI MBs per slice at block 504 and Non-ROI MBs with mode smoothing at block 506. The mode smoothing is further prioritized according to forced uniform motion at block 507 and forced B-skips at block 508.

Mode smoothing may be applied to group MBs with similar characteristics. For every 3×3 or 5×5 window of MBs, the windows of MBs are assessed for uniformity of modes. Outliers (MB with mode that is different from remaining MBs) in the window are identified. If outliers are marginally different, they are forced to a mode of the window. Otherwise, the mode for the outlier is maintained. For example, if in a 3×3 MB window, one MB is inter mode while the others are skip and if the residual (indicated by CBP or MB size) of the inter MB is less than a Skip threshold, the MB is forced to skip mode. After mode smoothing, the proportion of skip vs. direct/inter mode MBs is computed and included as a factor of complexity. Additionally, connected regions of skip MBs may be combined as tiles through MB dilation and MB erosion (as in the patent application Ser. No. 12/145,900 . Tiles can then be qualified as skip/static, non-static, uniform motion, region-of-interest (ROI, based on relative MB/tile size) etc. In the case of uniform motion tile, MVs of the MBs may be quantized and the tile may be forced to one MV (note that this may be done provided the residual/CBP of these MBs are zero or almost zero). Another option is where only non-static or ROI tiles are decoded and rest are forced to be skipped. In this case, some of the non-ROI MBs may be of modes other than skip but will be forced to skip such as in blocks 500 and 508.

Figure 22:
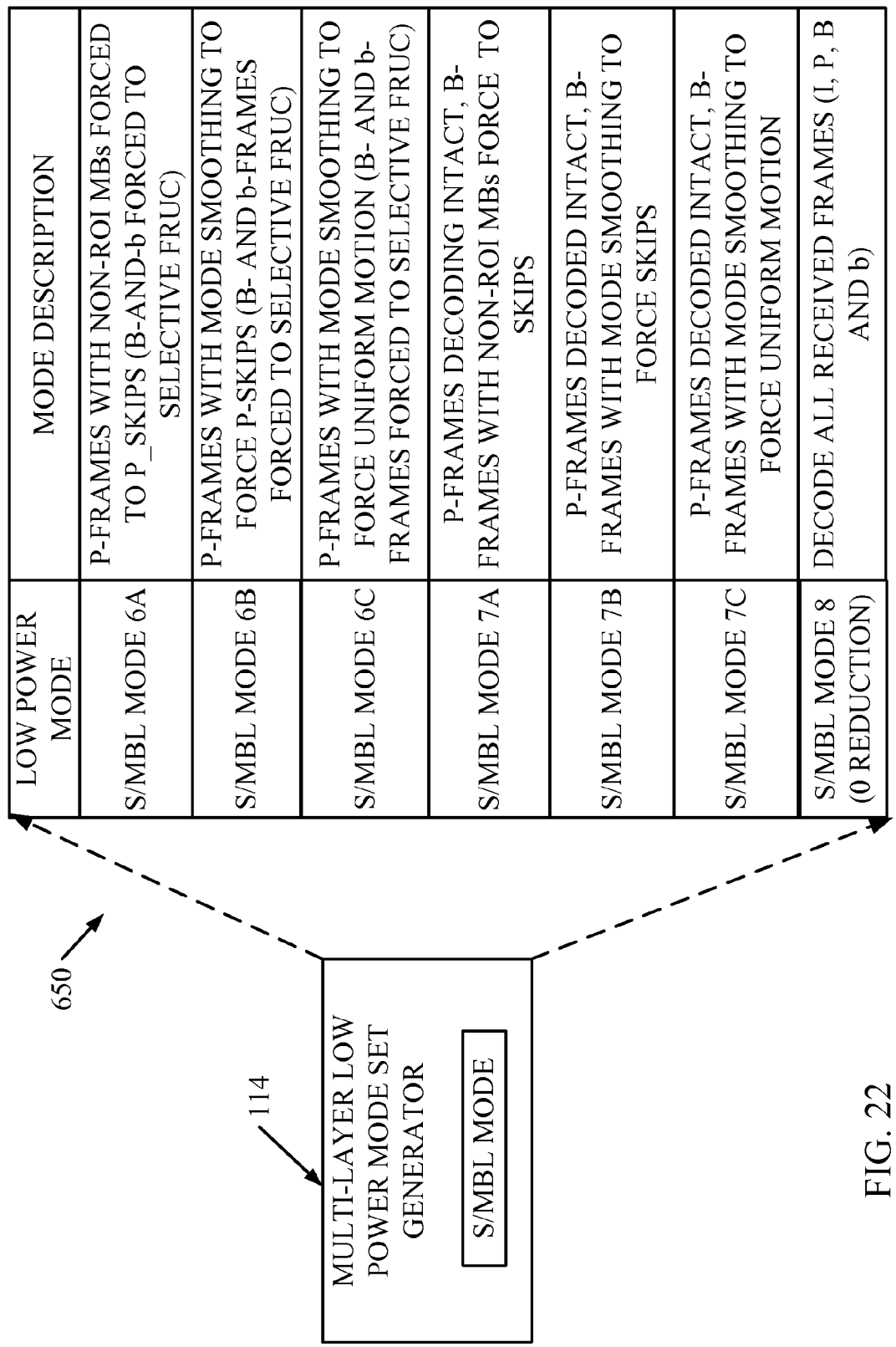
FIG. 22 shows a multi-layer low power mode set generator during the S/MBL mode.

FIG. 22 shows a multi-layer low power mode set generator 114 during the S/MBL mode. The multi-layer low power mode set generator 114 generates a hierarchical list of low power modes 650. The ability to manipulate which of the MBs in a frame and which of the received frames are processed provides a significant level of granularity in managing the decoding and rendering process. In addition, the above described MB level power optimization may be performed during decoding (on-the-fly). Again, detailed profiling and power analysis is required to map the proportion of reduction in power to the corresponding low power mode.

The examples of modes are described as S/MBL mode 6A, 6B, 6C, 7A, 7B, 7C and 8. In mode 6A, the I-frames are decoded per normal decoding of the I-frames. However, additional alternate operations may take place to improve visual quality or granularity as power permits. For example, in mode 6A, the P-frames with non-ROI MBs may be forced to P_Skips and B- and b-frames may be forced to selective FRUC. In mode 6B, I-frames are decoded as per normal decoding of I-frames. Alternate operations in mode 6B may include forcing P-frames with mode smoothing to P_Skips and B- and b-frames to selective FRUC. In mode 6C, the I-frames are decoded according to the normal decoding process. However, as an alternate operation, P-frames with mode smoothing may be forced uniform motion and B-and b-frames may be forced to selective FRUC. In mode 7A, the I and P-frames are decoded according to the normal decoding process. However, as an alternate operation, B-frames with non-ROI MBs are forced to Skips. In mode 7B, the I and P-frames are decoded according to the normal decoding process. However, as an alternate operation, B-frames with mode smoothing are forced to Skips. In mode 7C, the I and P-frames are decoded according to the normal decoding process. However, as an alternate operation, B-frames with mode smoothing are force uniform motion. In mode 8, all received frames (I, P, B and b) are decoded.

Figure 23:
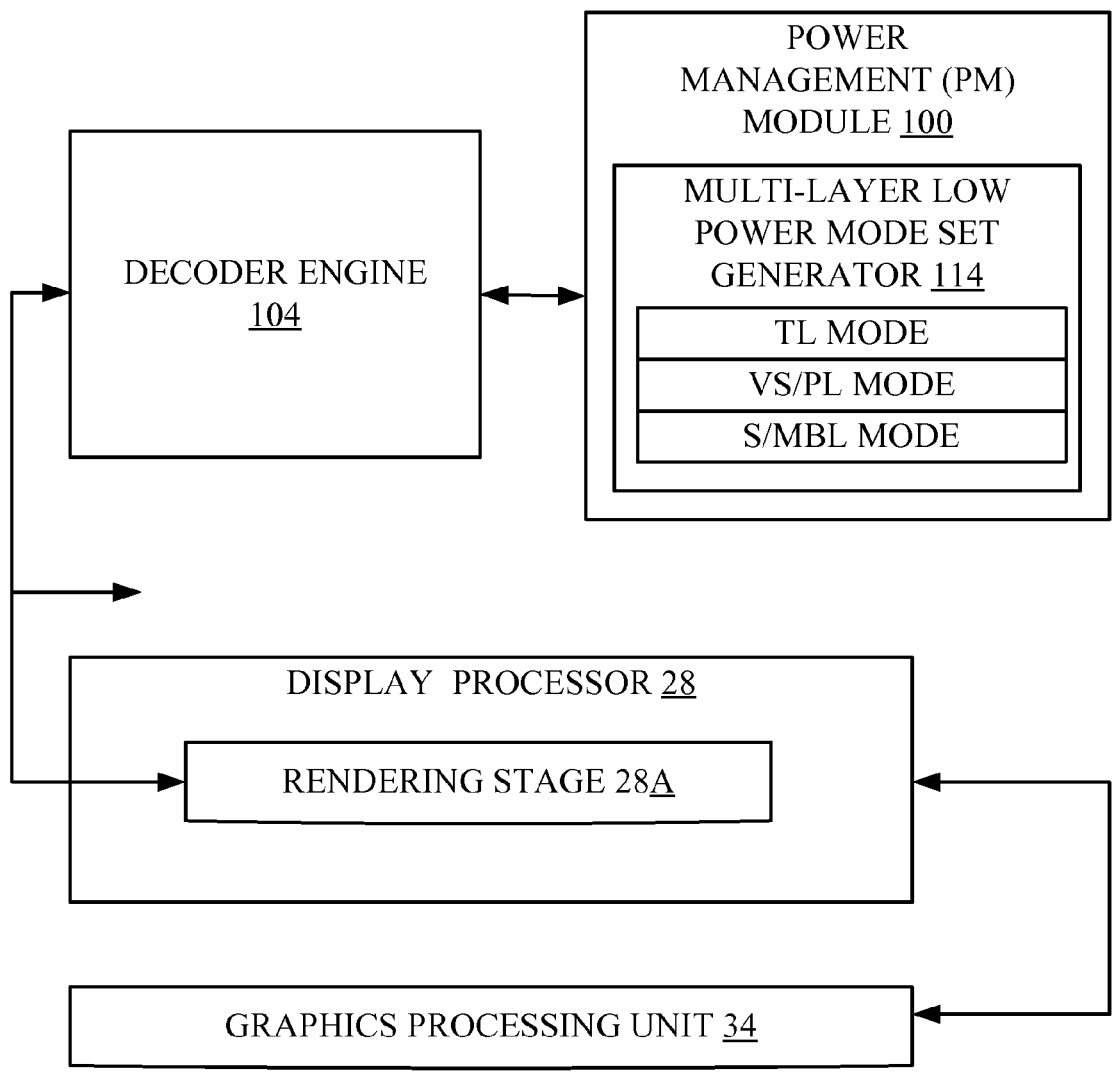
FIG. 23 shows a high level block diagram of the power management operations.

FIG. 23 shows a high level block diagram of the power management operations. The block diagram includes the decoder engine 104 in communication with a rendering stage 28A of the display processor 28. Thus, the power management (PM) module 100 processes the bitstreams at the TL mode, VS/PL mode and the S/MBL modes. The PM module 100 controls the decoder engine 104 to decode the decodable units according to the low power mode selected. The processing required during rendering is also derived from the prioritized sequence of operations from the framework in any of the low power mode of operations described above. Furthermore, the output of the decoder engine 114 may be sent to other devices, memory, or apparatus. The output from the decoder may be forwarded to another video enabled apparatus for eventual storage or consumption (display). The graphics processing unit 34 is also in communication with the display processor 28

Figure 24:
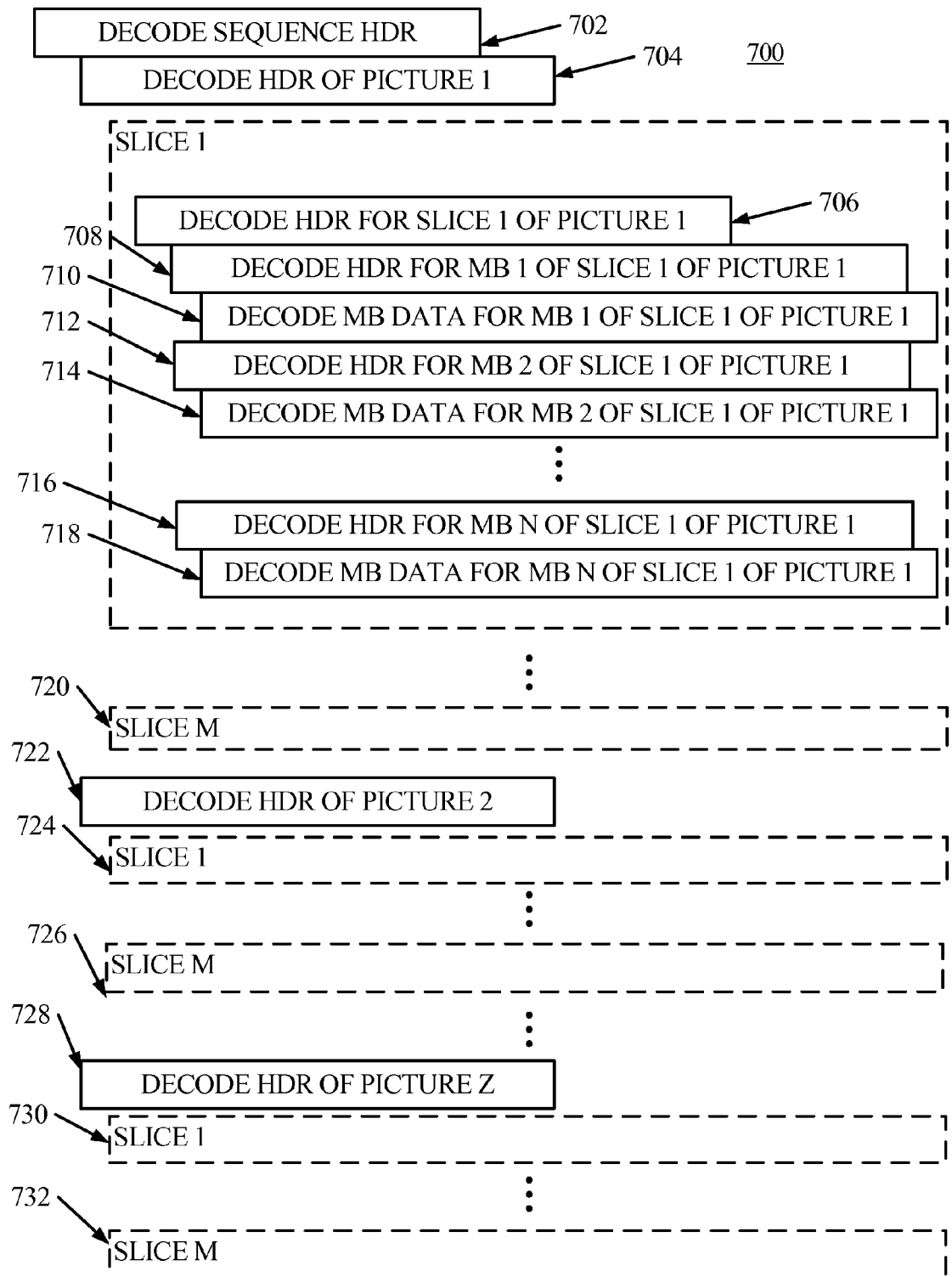
FIG. 24 shows an exemplary standard (normal) decoding process in sequential order.

FIG. 24 illustrates an exemplary standard (normal) decoding process 700 in sequential order. The process 700 is also described in relation to FIG. 2D. Beginning at the video sequence and picture layer, the standard (normal) decoding process 700 will decode a sequence header 54A at block 702 followed by decoding a picture header 58A of picture 1 at block 704. After decoding the picture header of picture 1, the picture data 58B is decoded which includes the slice and macroblock information. Thus, when the picture 1 data decoded, all of the slice units are decoded denoted by slice 1-M. Since each slice is decoded similarly, only one slice will be described in more detail.

When slice 1 is decoded, the slice header 60A of slice 1 of picture 1 is decoded at block 706. Then, the MB header 62A of macroblock (MB) 1 of slice 1 of picture 1 is decoded at block 708. After, the MB header 62A of the MB1 is decoded, the related MB data for MB1 of slice 1 of picture 1 is decoded at block 710. Then the next macroblock is obtained. Thus, the MB header 62A of macroblock (MB) 2 of slice 1 of picture 1 is decoded at block 712. After, the MB header of the MB2 is decoded, the related MB data 62B for MB2 of slice 1 of picture 1 is decoded at block 714. The decoding of the macroblock header followed by the related MB data 62B continues for all remaining MBs in the slice. In this example, there are N MBs. Thus, the decoding of slice 1 of picture 1 would end with decoding the MB header for MB N of slice 1 of picture 1 at block 716 followed by decoding the related MB data 62B of MB N of slice 1 of picture 1 at block 718.

Thus, the process 700 would continue decoding the picture 1 information by decoding each of the remaining slices in a similar manner as described above for slide 1. In this example, there are M slices. Thus, at block 720, the slice M is decoded in the manner as described above in relation to blocks 706-718.

Next, the process 700 would decode the next picture frame such as picture 2. To decode picture 2, the process 700 would decode the picture header 58A of picture 2 at block 722 to derive the locations for slices 1-M, Thus, at block 724, the slice 1 is decoded in the manner as described above in relate to blocks 706-718. All remaining slices of picture 2 are decoded similarly. Thus, at block 726, the slice M is decoded in the manner as described above in relation to blocks 706-718 to complete the decoding of picture 2.

The process 700 repeats the decoding of all the picture frames sequentially in a similar manner until the last picture Z. In this example, there are pictures 1-Z. Hence to decode the last picture, picture Z, the process 700 would decode the picture header 58A of picture Z at block 728 followed by slice 1 decoding at block 730. Each slice is decoded in picture Z until slice M at block 732.

Figure 25:
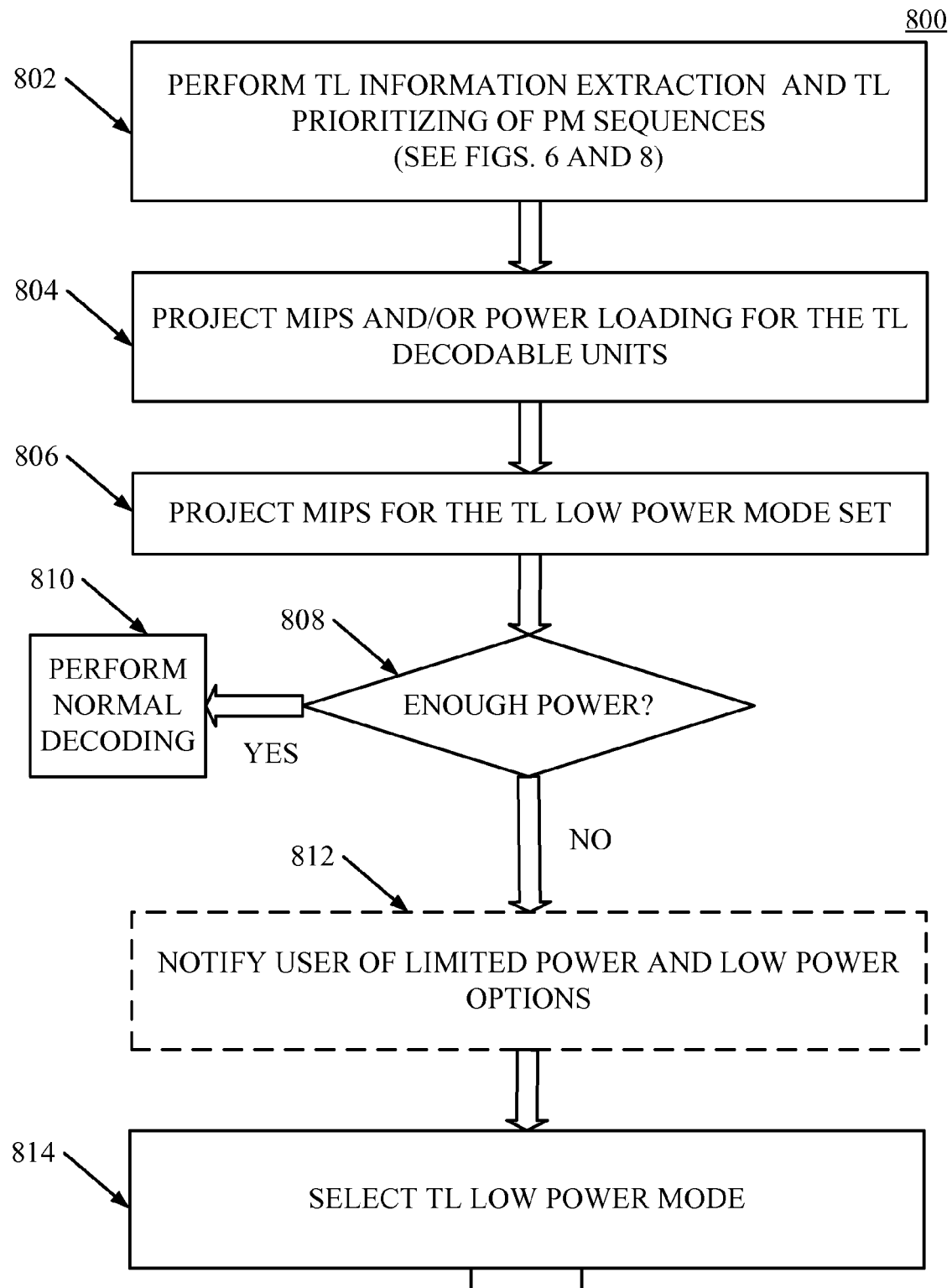
FIG. 25 shows a flowchart of a TL decoding process with power management operations.

FIG. 25 illustrates a flowchart of a TL decoding process 800 with power management operations. The process 800 begins with block 802 where TL information extraction and TL prioritization of the PM sequences of decodable units takes place, as described in relation to FIGS. 6 an 8. Block 802 is followed by block 804 where the MIPS and/or power loading are projected for the TL prioritized PM sequences. Block 804 is followed by block 806 where the MIPS for the TL low power mode set is projected. Block 806 is followed by block 808 where a determination is made whether there is enough power to decode the bitstream. If the determination is "YES," then the normal decoding process 700 may take place at block 810 in accordance with the procedure described in relation to FIG. 24. However, if the determination is "NO," then as an option, the user may be notified that there is insufficient power such as to playback a video at block 812. The user would be given low power mode options corresponding to modes 1, 1A and 2 from which to select. Alternately, the low power mode may be selected automatically. Block 812 is followed by block 814 where a TL low power mode is selected whether by a user or automatically. The flowchart of FIG. 25 proceeds to FIG. 26.

Figure 26:
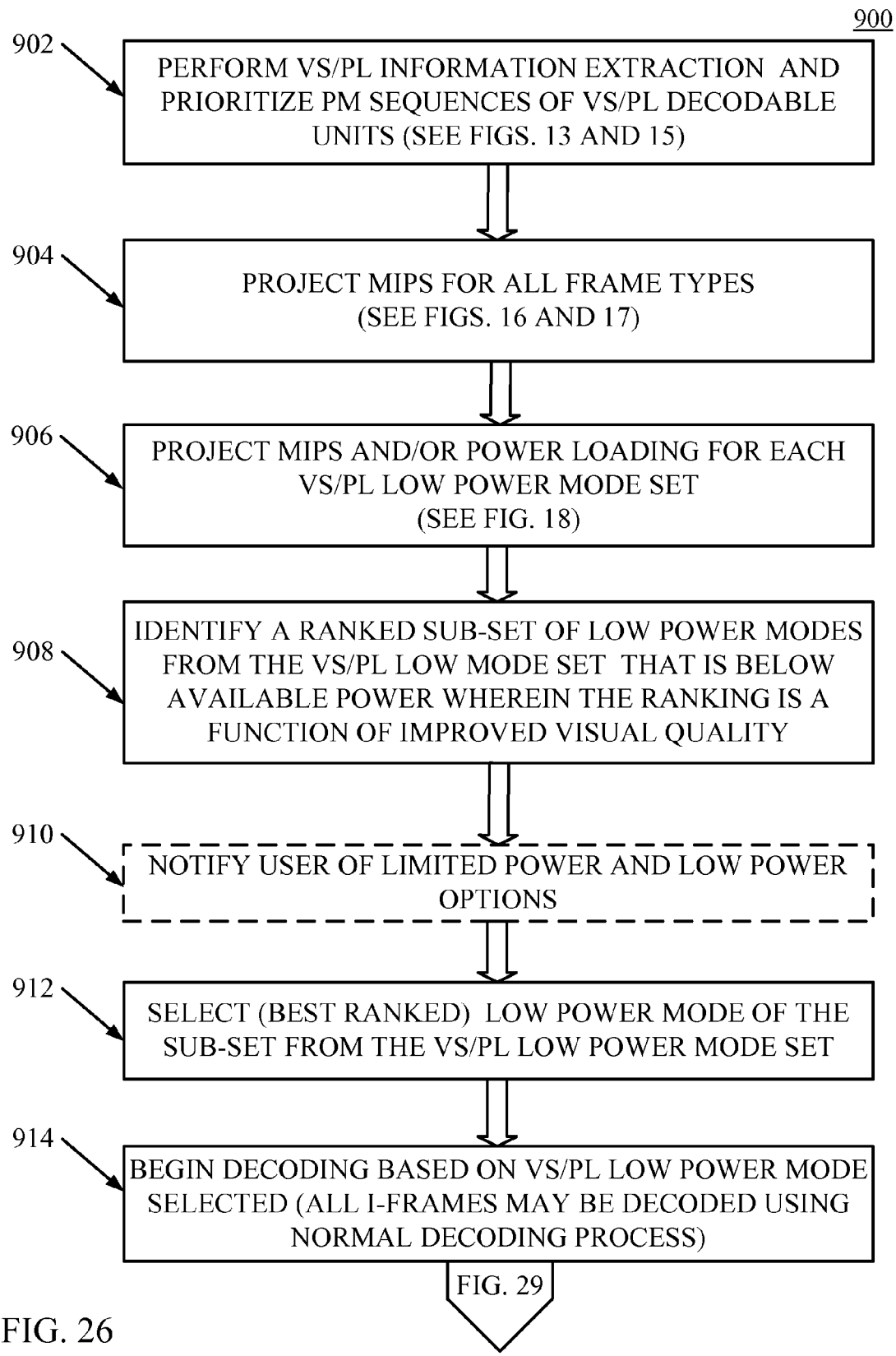
FIG. 26 shows a flowchart of a VS/PL decoding process with power management operations.

FIG. 26 illustrates a flowchart of a VS/PL decoding process 900 with power management operations. The process 900 begins with performing at block 902 the VS/PL information extraction and VS/PL prioritizing the PM sequences, such as described in FIGS. 13 and 15. At block 904, the MIPS for all frames types (decodable units) are projected as described in related to FIGS. 16 and 17. At block 906, the MIPS and/or power loading for each VS/PL low mode set, as shown in FIG. 18, is projected based on the VS/PL prioritized PM sequences. Based on the projected MIPS, PM sequences are grouped together based on visual quality and granularity. Some of the sequences (such as all sequences) may not be decoded because of insufficient power. Thus, at block 908, a ranked sub-set of low power modes from the VS/PL low power mode set that is below the maximum available power may be generated. The ranking is a function of improved visual quality and/or granularity. At block 910, optionally, the user may be notified of the limited power and provided a selection of low power mode options. At block 912, the best ranked low power mode of the sub-set may be selected or the low power mode selected by the user. At block 914, based on the selected VS/PL low power mode, decoding begins by interjecting the decoding operations back into the normal decoding process 700 of FIG. 24 as appropriate.

In one configuration, after each frame is decoded based on one selected low power mode, the MIPS may be re-projected. Thereafter, the next frame or other un-decoded frames in the bitstream may be decoded using a different selected mode. Thus, the low power mode may be dynamically changed or generated on the fly during the decoding of the bitstream.

Figure 27:
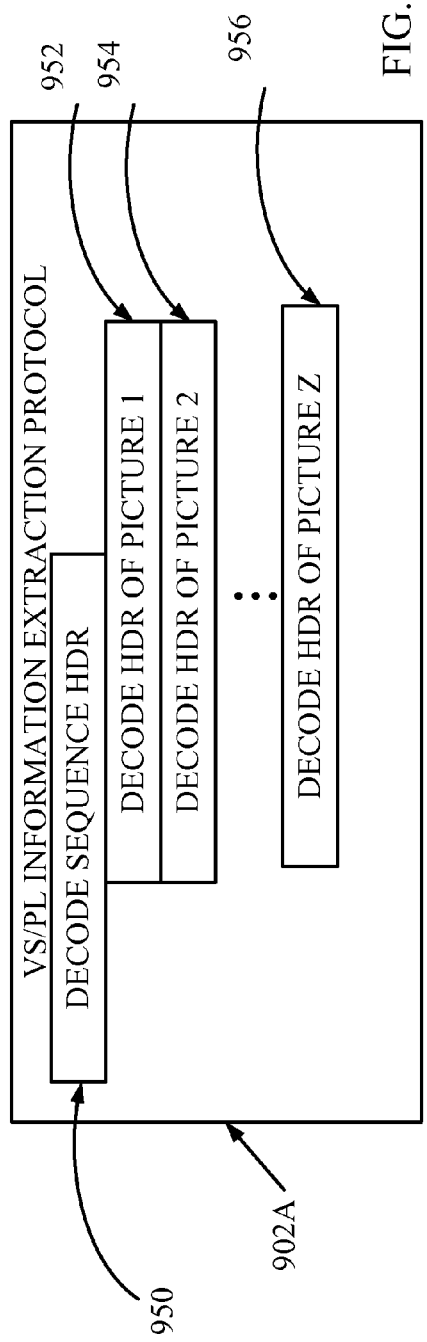
FIG. 27 shows a block diagram of a VS/PL information extraction protocol.

FIG. 27 illustrates a block diagram of a VS/PL information extraction protocol 902A which diverges from the normal decoding process 700 of FIG. 24. In FIG. 27, the VS/PL information extraction protocol 902A will decode the sequence header 54A at block 950. Thus, the location of the pictures 1-N is derived as denoted by the arrow above each block denoted for pictures 1-N. At block 952, the picture header 58A of picture 1 is decoded. At block 954 the picture header 58A of picture 2 is decoded. All picture headers are decoded. At block 956, the picture header for picture Z (the last picture) is decoded. Thus, the decoding of the picture headers 58A allows the PM sequences of decodable units to be derived for a particular bitstream and the MIPS projected for the PM sequences of decodable units.

Figure 28:
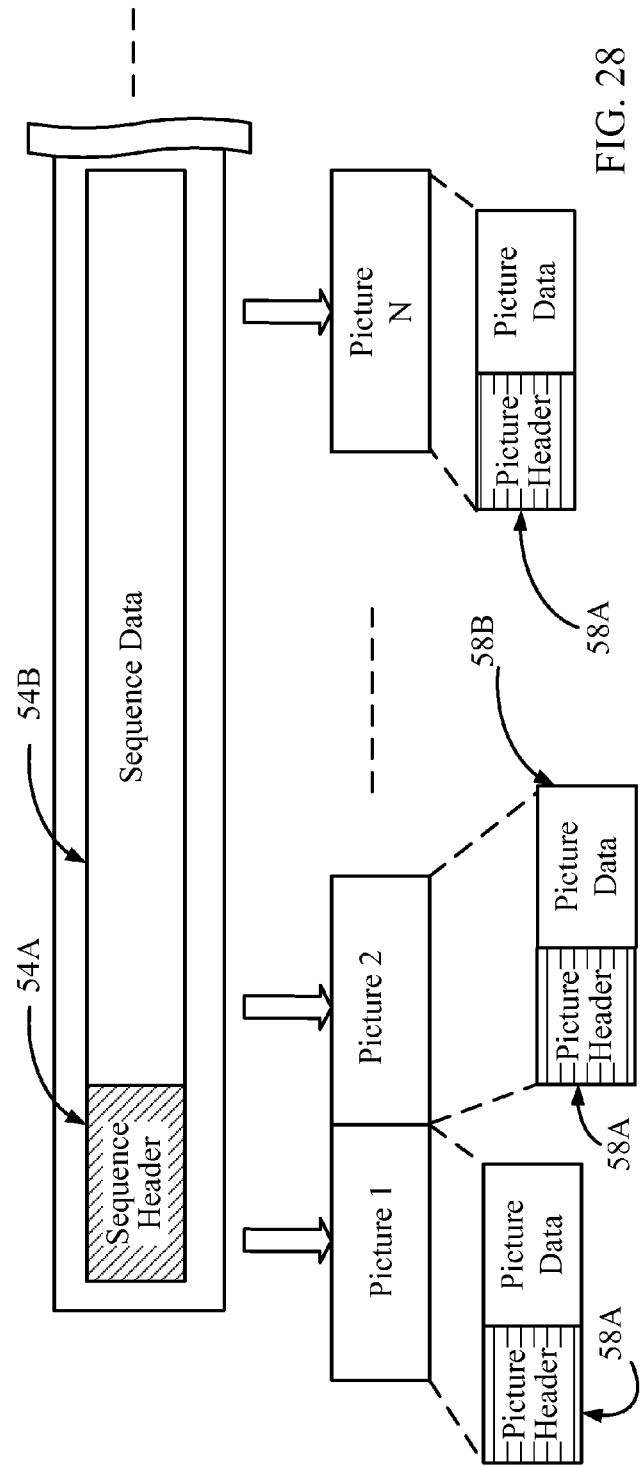
FIG. 28 shows a block diagram of the VS/PL decoded units from the bitstream in accordance with the VS/PL information extraction protocol.

FIG. 28 illustrates a block diagram of the VS/PL decoded units from the bitstream in accordance with the VS/PL information extraction protocol 902A. The sequence header 54A is shown hatched to denote that the sequence header 54A has been decoded. Furthermore, the picture headers 58A for each of the pictures 1-N are shown hatched to denote that the picture headers 58A have been decoded. The picture data 58B remains unhatched to denote that it remains undecoded at this point. The sequence data 54B also remains un-decoded. The decoding of the picture headers 58A allows the necessary slice locations to be obtained for the slice and macroblock layer without decoding the picture data.

Figure 29:
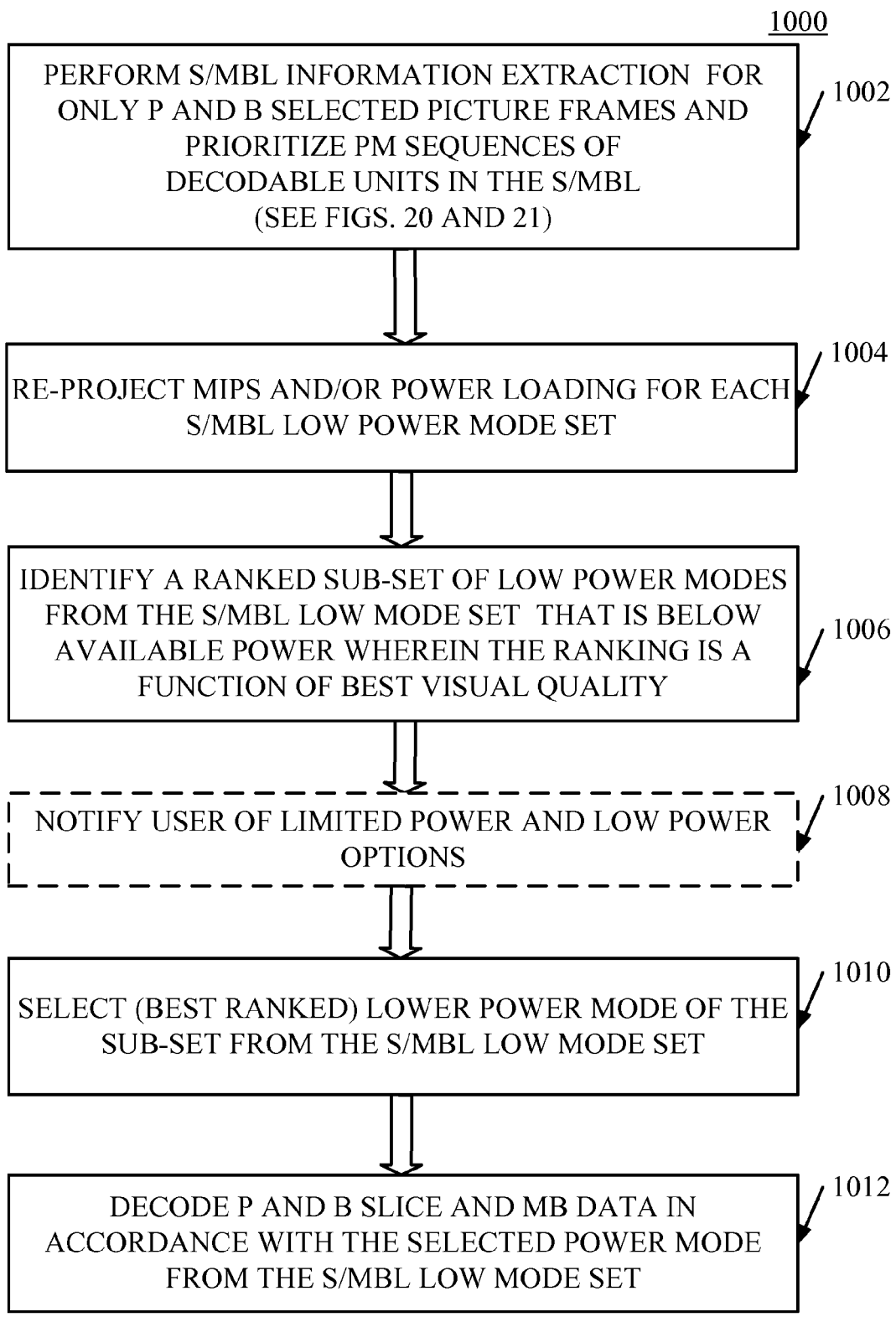
FIG. 29 shows a flowchart of an S/MBL decoding process with power management operations.

FIG. 29 illustrates a flowchart of a S/MBL decoding process 1000 with power management operations. The process 1000 begins at block 1002 with performing the S/MBL information extraction and S/MBL prioritizing of the PM sequences of decodable units, such as described in FIGS. 20 and 21. In one configuration, only information for the P and B-frames are extracted and prioritized. At block 1004, the MIPS for each of the S/MBL low power modes are re-projected. At block 1006, a ranked sub-set of low power modes from the S/MBL low power mode set that is below the maximum available power is generated. The ranking is a function of improved visual quality and/or granularity. At block 1008, optionally, the user may be notified of the limited power and provided a selection of low power mode options. At block 1010, the best ranked low power mode of the sub-set may be selected or the low power mode selected by the user. At block 1012, based on the selected S/MBL low power mode, P and B-frame slice and MB data decoding begins by interjecting the decoding operations back into the normal decoding process 700 of FIG. 24 as appropriate. After block 1012, the MIPS may be re-projected after one or more frames have been decoded so that the low power mode may be upgraded or downgraded according to the remaining available power.

Figure 30:
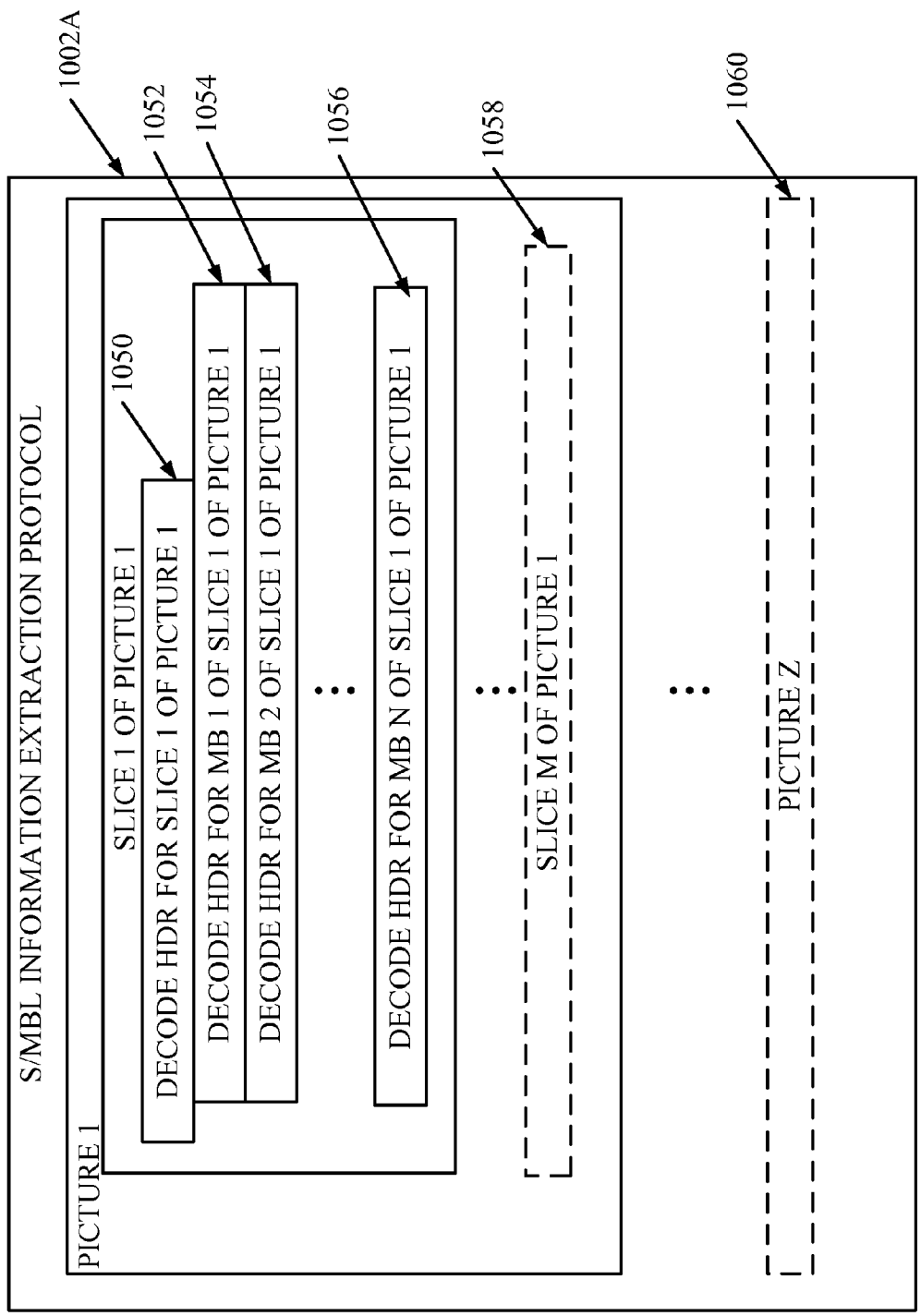
FIG. 30 shows a block diagram of an S/MBL information extraction protocol.
Figure 31:
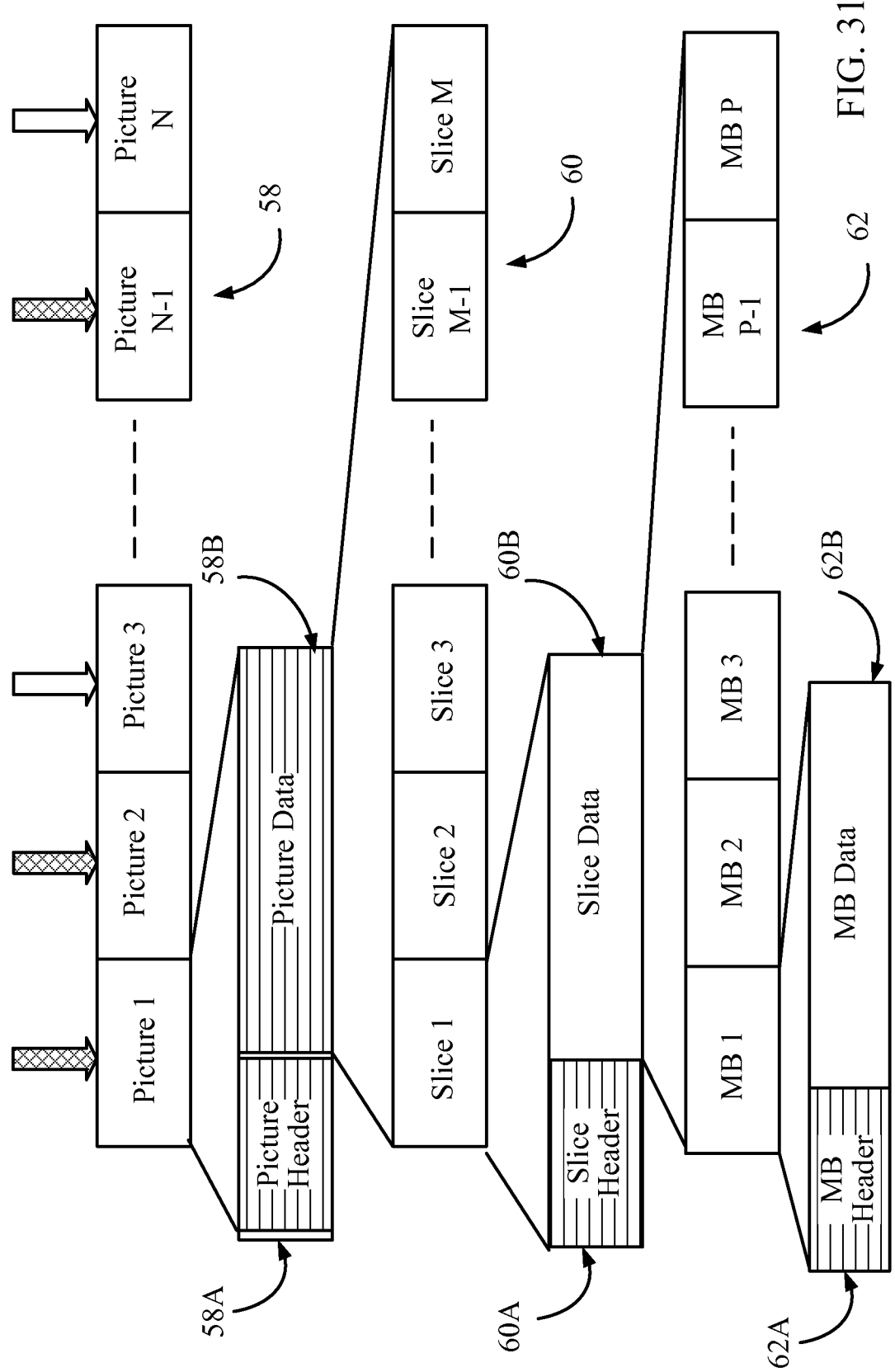
FIG. 31 shows a block diagram of S/MBL decoded units from the bitstream in accordance with the S/MBL information extraction protocol.

FIG. 30 illustrates a block diagram of a S/MBL information extraction protocol 1002A which diverges from the normal decoding process 700 of FIG. 24. FIG. 30 will be described in conjunction with FIG. 31. FIG. 31 illustrates a block diagram of a S/MBL decoded units from the bitstream in accordance with the S/MBL information extraction protocol 1002A. The S/MBL information extraction protocol 1002A will decode the picture data 58B for the first picture 1. To decode the picture data 58B, only the slice header 60A and MB header 62B are decoded until a low power mode can be selected. The arrows above the blocks for pictures 1-N indicate a location of the picture. The black shading of the arrows denotes the selection of the picture based on a low power mode. The non-shaded arrows denotes a picture that has not been selected. At block 1050, the slice header 60A for picture 1 is decoded at block 1050. At block 1052, the MB header 62A of MB 1 of slice 1 of picture 1 is decoded. At block 1054, the MB header 62A of MB 2 of slice 1 of picture 1 is decoded. All macroblock headers for slice 1 of picture 1 are decoded where at block 1056, the MB header for MB N of slice 1 of picture 1 is decoded. The macroblock data 62B is not decoded. The hatching of picture data 58B, slice header 60A and MB header 62A denotes decoding thereof.

The slice header 60A of each slice is decoded followed by the decoding of the MB header of each MB of a slice. The, at block 1058, slice M (the last slice) of picture 1 is decoded in a similar manner as block 1050-1056. All remaining pictures are decoded in a similar manner. At block 1060, the picture Z (the last picture) is decoded as described above in relation to blocks 1050-1058. Thus, the decoding of the slice and macroblock headers allows the PM sequences of decodable units to be derived for a particular bitstream and the MIPS projected for the PM sequences of decodable units.

Figure 32:
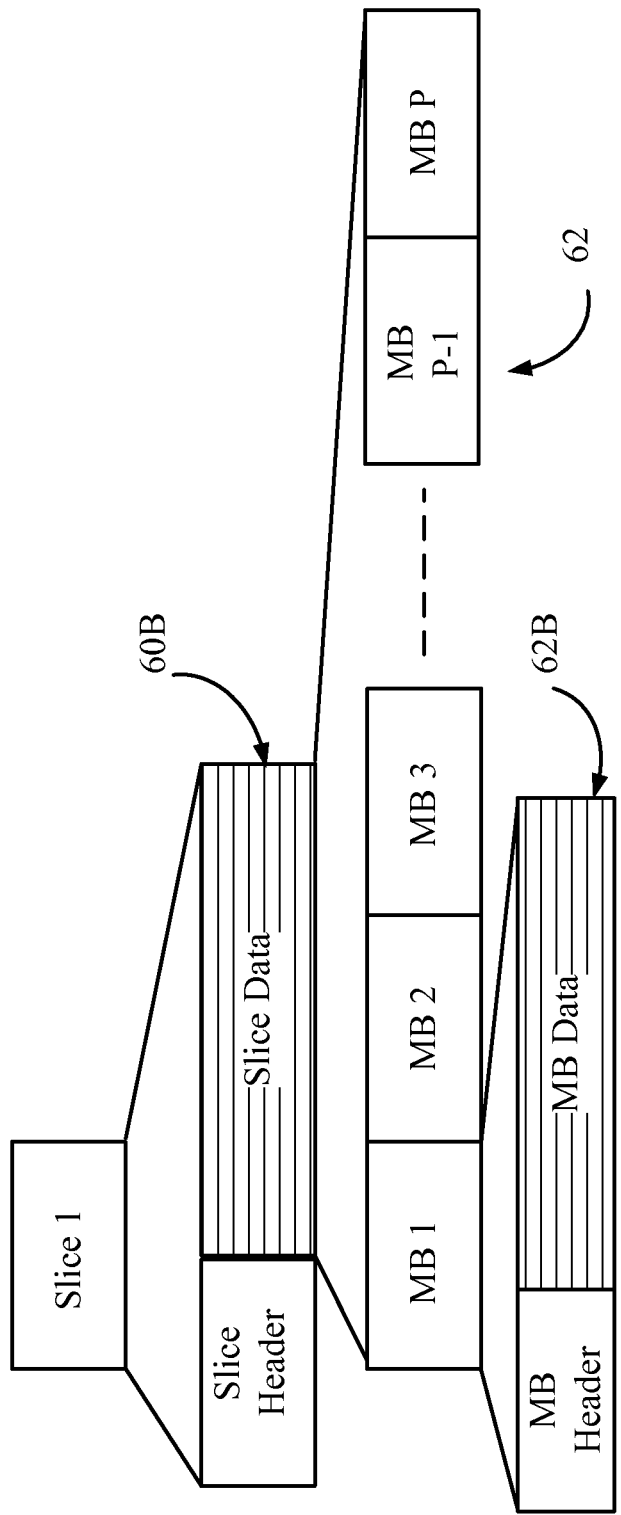
FIG. 32 shows a block diagram of the final slice and macroblock decoding according to a selected power management mode.

FIG. 32 illustrates a block diagram of the final slice and macroblock decoding according to a selected power management mode. The slice data 60B and the MB data 62B are decoded according to the PM sequences to be decoded for the selected low power mode (such as modes 6A-6C and 7A-7C). The slice data 60B and the MB data 62B are shown hatched to indicate decoding thereof.

Figure 33:
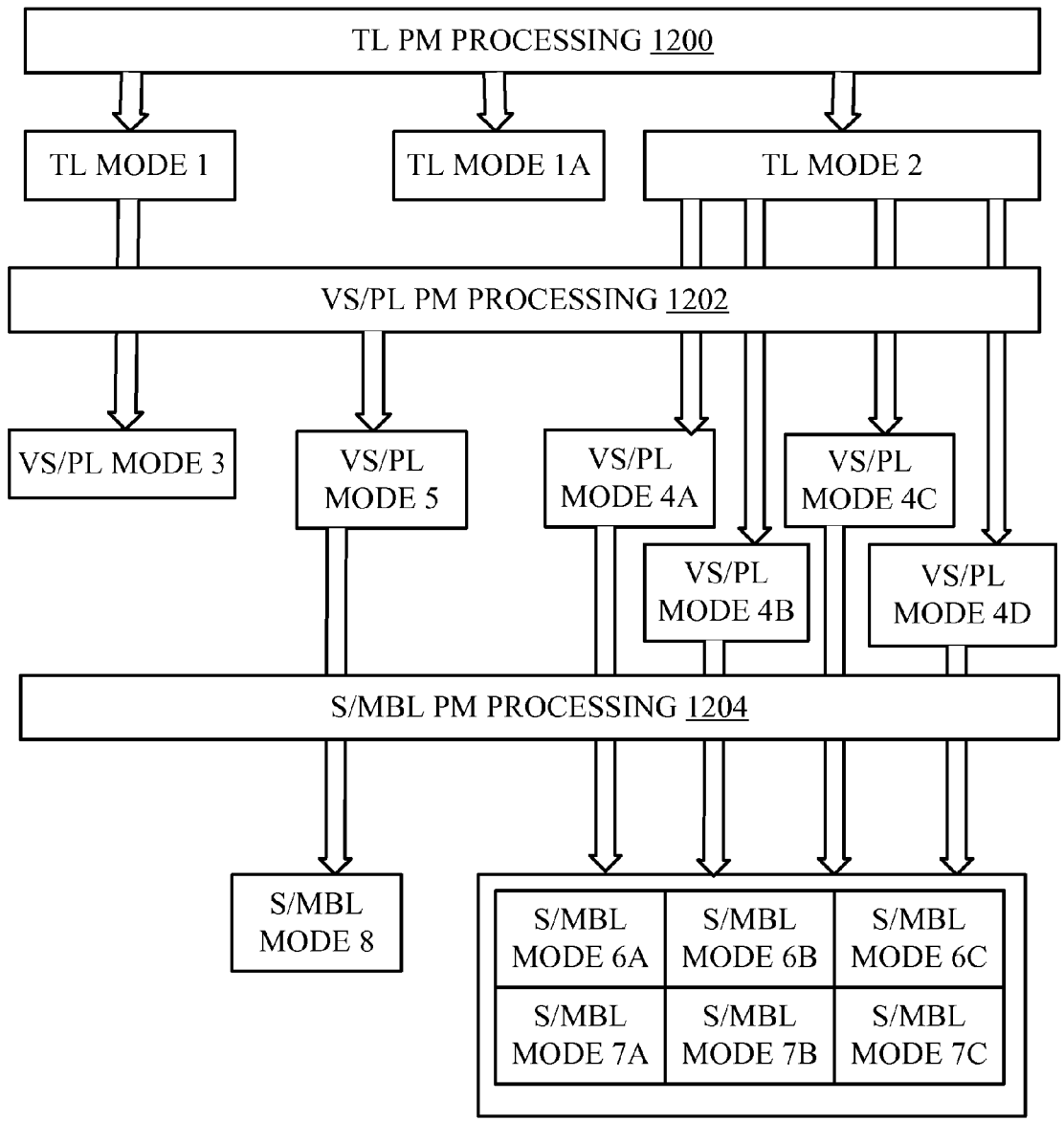
FIG. 33 shows a block diagram of a hierarchical arrangement of the multi-layer power management modes.

FIG. 33 illustrates a block diagram of a hierarchical arrangement of the multi-layer power management modes. The TL PM processing 1200 begins the first tier of power management at the transport layer 52. As the result of the TL PM processing 1200, a plurality of low power modes are established based on the projected MIPS. In one configuration, modes 1, 1A and 2 are proposed. The power management operations continue to a second tier at VS/PL PM processing 1202. The second tier of power management is conducted at the sequence and picture layer 70. The VS/PL PM processing 1202 produces a plurality of low power modes as a function of projected MIPS and visual quality and/or granularity. In one configurations, modes 3, 4A-4D are generated. Mode 5 is a power mode but may not be a low power mode if all frames are decoded. Nonetheless, the power management operations continue to a third tier at S/MBL PM processing 1204. The third tier of power management is conducted at the slice and macroblock layer 72. The S/MBL PM processing 1204 produces a plurality of low power modes as a function of projected MIPS and visual quality and/or granularity. In one configurations, modes 6A-6C and 7A-7C are generated. Mode 8 allows all the frames to be decoded if power permits. Furthermore, mode 8 may be used after a part of the bitstream has been decoded and the re-projection of the MIPS indicates that all remaining frames may be decoded.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

The invention claimed is:

1. A method comprising:
receiving, by a receiving device from a transmitting device that is separate from the receiving device, a data stream comprising multimedia content and power management (PM) metadata, wherein the multimedia content comprises a plurality of PM sequences of decodable units, and wherein the PM metadata provides an indication of a required processing power and a priority for each PM sequence of decodable units of the plurality of PM sequences of decodable units;
determining an amount of available electrical power;
determining, based on the PM metadata and the amount of available electrical power, a processing complexity to optimize a quality of experience (QoE); and
adjusting a multimedia processing complexity based on the determined processing complexity.

2. The method of claim 1, wherein adjusting the multimedia processing complexity comprises negotiating the multimedia processing complexity.

3. The method of claim 1, wherein adjusting the multimedia processing complexity comprises reviewing the processing complexity of a multimedia workload and minimizing the required processing to an acceptable predetermined low power mode.

4. The method of claim 1, wherein the amount of available electrical power is an available battery reserve.

5. The method of claim 1, wherein determining the processing complexity to optimize the QoE further comprises determining the processing complexity to optimize a battery life.

6. The method of claim 1, further comprising negotiating communications between a server and a connected wireless device based on the amount of electrical power and properties of the connection.

7. The method of claim 6, wherein the wireless device transmits data to the server regarding an optimum processing complexity of the multimedia content.

8. The method of claim 6, wherein the wireless device transmits data to the server regarding a bandwidth capacity of the wireless device.

9. The method of claim 6, wherein the wireless device transmits data to the server regarding a status of the wireless device.

10. The method of claim 6, wherein the wireless device sends instructions to the server to adjust the amount of information being transmitted from the server to the wireless device based on the amount of electrical power and a processing resource.

11. The method of claim 10, wherein the instructions comprise instructions to compress video data.

12. An apparatus comprising:
means for a receiving device receiving from a transmitting device that is separate from the receiving device a data stream comprising multimedia content and power management (PM) metadata, wherein the multimedia content comprises a plurality of PM sequences of decodable units, and wherein the PM metadata provides an indication of a required processing power and a priority for each PM sequence of decodable units of the plurality of PM sequences of decodable units;
means for determining an amount of available electrical power;
means for determining, based on the PM metadata and the amount of available electrical power, a processing complexity to optimize a quality of experience (QoE); and
means for adjusting a multimedia processing complexity based on the determined processing complexity.

13. The apparatus of claim 12, wherein the means for adjusting the multimedia processing complexity comprises means for negotiating the multimedia processing complexity.

14. The apparatus of claim 12, wherein the means for adjusting the multimedia processing complexity comprises means for reviewing the processing complexity of a multimedia workload and minimizing the required processing to an acceptable predetermined low power mode.

15. The apparatus of claim 12, wherein the amount of available electrical power is an available battery reserve.

16. The apparatus of claim 12, wherein the means for determining the processing complexity to optimize the QoE further comprises means for determining the processing complexity to optimize a battery life.

17. The apparatus of claim 12, further comprising means for negotiating communications between a server and a connected wireless device based on the amount of electrical power and properties of the connection.

18. The apparatus of claim 17, wherein the wireless device transmits data to the server regarding an optimum processing complexity of the multimedia content.

19. The apparatus of claim 17, wherein the wireless device transmits data to the server regarding a bandwidth capacity of the wireless device.

20. The apparatus of claim 17, wherein the wireless device transmits data to the server regarding a status of the wireless device.

21. The apparatus of claim 17, wherein the wireless device sends instructions to the server to adjust the amount of information being transmitted from the server to the wireless device based on the amount of electrical power and a processing resource.

22. The apparatus of claim 21, wherein the instructions comprise instructions to compress video data.

23. A computer program product including a non-transitory computer-readable medium storing instructions which, when executed by a processor, cause the processor to:
receive, by a receiving device from a transmitting device that is separate from the receiving device, a data stream comprising multimedia content and power management (PM) metadata, wherein the multimedia content comprises a plurality of PM sequences of decodable units, and wherein the PM metadata provides an indication of a required processing power and a priority for each PM sequence of decodable units of the plurality of PM sequences of decodable units;
determine an amount of available electrical power;
determine, based on the PM metadata and the amount of available electrical power, a processing complexity to optimize a quality of experience (QoE); and
adjust a multimedia processing complexity based on the determined processing complexity.

24. The computer program product of claim 23, wherein the instructions that cause the processor to adjust the multimedia processing complexity comprise instructions that cause the processor to negotiate the multimedia processing complexity.

25. The computer program product of claim 23, wherein the instructions that cause the processor to adjust the multimedia processing complexity comprise instructions that cause the processor to review the processing complexity of a multimedia workload and minimize the required processing to an acceptable predetermined low power mode.

26. The computer program product of claim 23, wherein the amount of available electrical power is an available battery reserve.

27. The computer program product of claim 23, wherein the instructions that cause the processor to determine the processing complexity to optimize the QoE further comprise instructions that cause the processor to determine the processing complexity to optimize a battery life.

28. The computer program product of claim 23, further comprising instructions that cause the processor to negotiate communications between a server and a connected wireless device based on the amount of electrical power and properties of the connection.

29. The computer program product of claim 28, wherein the wireless device transmits data to the server regarding an optimum processing complexity of the multimedia content.

30. The computer program product of claim 28, wherein the wireless device transmits data to the server regarding a bandwidth capacity of the wireless device.

31. The computer program product of claim 28, wherein the wireless device transmits data to the server regarding a status of the wireless device.

32. The computer program product of claim 28, wherein the wireless device sends instructions to the server to adjust the amount of information being transmitted from the server to the wireless device based on the amount of electrical power and a processing resource.

33. The computer program product of claim 32, wherein the instructions comprise instructions to compress video data.

34. A receiving device comprising:
a processor configured to execute a set of instructions operable to:
receive from a transmitting device that is separate from the receiving device a data stream comprising multimedia content and power management (PM) metadata, wherein the multimedia content comprises a plurality of PM sequences of decodable units, and wherein the PM metadata provides an indication of a required processing power and a priority for each PM sequence of decodable units of the plurality of PM sequences of decodable units;
determine an amount of available electrical power;
determine, based on the PM metadata and the amount of available electrical power, a processing complexity to optimize a quality of experience (QoE); and
adjust a multimedia processing complexity based on the determined processing complexity.

35. The device of claim 34, wherein adjusting the multimedia processing complexity comprises negotiating the multimedia processing complexity.

36. The device of claim 34, wherein adjusting the multimedia processing complexity comprises reviewing the processing complexity of a multimedia workload and minimizing the required processing to an acceptable predetermined low power mode.

37. The device of claim 34, wherein the amount of available electrical power is an available battery reserve.

38. The device of claim 34, wherein determining the processing complexity to optimize the QoE further comprises determining the processing complexity to optimize a battery life.

39. The device of claim 34, wherein the processor is further configured to execute instructions to negotiate communications between a server and a connected wireless device based on the amount of electrical power and properties of the connection.

40. The device of claim 39, wherein the wireless device transmits data to the server regarding an optimum processing complexity of the multimedia content.

41. The device of claim 39, wherein the wireless device transmits data to the server regarding a bandwidth capacity of the wireless device.

42. The device of claim 39, wherein the wireless device transmits data to the server regarding a status of the wireless device.

43. The device of claim 39, wherein the wireless device sends instructions to the server to adjust the amount of information being transmitted from the server to the wireless device based on the amount of electrical power and a processing resource.

44. The device of claim 43, wherein the instructions comprise instructions to compress video data.

\* \* \* \* \*